United States Patent [19]
Marx et al.

[11] Patent Number: 5,670,864
[45] Date of Patent: Sep. 23, 1997

[54] ADAPTIVE AUTOMATIC POWER CAPACITOR FOR CONTROLLING CONTROLLER A CAPACITOR BANK OF A POWER DISTRIBUTION SYSTEM

[75] Inventors: Thomas I. Marx, Hingham, Mass.; Richard A. Girard, North Providence, R.I.

[73] Assignee: Pacific Scientific Company, Weymouth, Mass.

[21] Appl. No.: 452,018

[22] Filed: May 26, 1995

[51] Int. Cl.$^6$ ................................................. G05F 1/70
[52] U.S. Cl. ................................................. 323/211; 323/210
[58] Field of Search ................................... 323/210, 211

[56] References Cited

U.S. PATENT DOCUMENTS

| | | | |
|---|---|---|---|
| 4,063,301 | 12/1977 | Lye | 361/88 |
| 4,307,331 | 12/1981 | Gyugyi | 323/210 |
| 4,317,076 | 2/1982 | Price | 323/210 |
| 4,365,190 | 12/1982 | Pasternack et al. | 323/211 |
| 4,470,005 | 9/1984 | Gyugyi | 323/210 |
| 4,555,658 | 11/1985 | Hausler et al. | 323/210 |
| 4,555,659 | 11/1985 | Gyugyi | 323/210 |
| 4,567,424 | 1/1986 | Dobsa et al. | 323/210 |
| 4,636,910 | 1/1987 | Chadwick | 361/103 |
| 4,677,364 | 6/1987 | Williams et al. | 322/47 |
| 4,752,726 | 6/1988 | Aoyama | 323/210 |
| 4,859,884 | 8/1989 | Yoshino | 307/646 |
| 4,999,565 | 3/1991 | Nilsson | 323/210 |
| 5,099,190 | 3/1992 | Sato | 323/210 |
| 5,134,356 | 7/1992 | El-Sharkawi et al. | 323/211 |
| 5,180,963 | 1/1993 | El-Sharkwai et al. | 323/211 |
| 5,198,746 | 3/1993 | Gyugyi et al. | 323/207 |
| 5,309,346 | 5/1994 | Gyugi | 363/54 |
| 5,402,058 | 3/1995 | Larsen | 323/211 |
| 5,532,575 | 7/1996 | Ainsworth et al. | 323/211 |

OTHER PUBLICATIONS

M.A. El–Sharkawi et al., "An Adaptive Power Factor Controller for Three–Phase Induction Generators," *IEEE Trans. on PAS*, vol. PAS–104, Jul. 1985, pp. 1825–1831.

M.A. El–Sharkawi et al., "Development and Field Testing of an Adaptive Power Factor Controller," *IEEE Trans. on Energy Conversion*, vol. EC–2, Dec. 1987, pp. 520–525.

T. Marx, "The Why and How of Power Capacitor Switching," Fisher Pierce Catalog, Dec. 1991.

Fisher Pierce brochure, "Powerflex® High Accuracy Line Post Current Sensors," Series 1301, Dec. 1993.

Fisher Pierce brochure, "Powerflex® Programmable Capacitor Controller," Series 3000, Dec. 1994.

M.A. El–Sharkawi et al., "Development and Field Testing of a 15–kV Class Adaptive Var Compensator," Paper No. 95 WM 254–3 PWRD, PES Winter Meeting, New York, NY Jan. 29–Feb. 2, 1995, pp. 1–8.

Primary Examiner—Jeffrey L. Sterrett
Attorney, Agent, or Firm—Lahive & Cockfield, LLP

[57] ABSTRACT

A power capacitor controller that adaptively and/or automatically determines a variety of operational parameters, including adaptively and automatically establishing the line phase angle correction value; adaptively and automatically establishing the appropriate electrical levels determining connection and disconnection of the capacitor bank relative to the line; adaptively and automatically establishing appropriate guard voltage levels determining connection and disconnection of the capacitor bank relative to the line; automatically determining when the capacitor bank is inoperative; automatically determining when a reverse power line condition and a reverse current line condition exists; automatically determining when a capacitor bank switching operation is a result of multiple capacitor banks on the line, and automatically determining when the operational set points of the controller are reversed.

69 Claims, 10 Drawing Sheets

ADAPTIVE AUTOMATIC POWER CAPACITOR FOR CONTROLLING CONTROLLER A CAPACITOR BANK OF A POWER DISTRIBUTION SYSTEM

BACKGROUND OF THE INVENTION

The present invention relates generally to control systems that control the reactive power of electric lines, and more particularly, it relates to a power capacitor controller that selectively couples capacitors to the electric line to adjust the reactive power thereof.

Today, electrical utility networks supply power for both commercial and residential purposes. In typical power networks, transmission lines carry both real and reactive power. The reactive power usually energizes cables, switches large industrial gears, and energizes reactive loads, e.g., motors and transformer coils, whereas the real power carried by the distribution lines performs the work at the load connected to the line.

Multi-phase AC electrical networks tend to undergo undesirable reactive power changes when subjected to the repeated connection and disconnection of large reactive loads onto and off of the distribution line. The reactive power changes that occur in the power network generally result in low system efficiency and high energy losses. More specifically, these energy losses occur, for example, when large inductive loads are connected to the distribution lines, thus producing an inordinate amount of lagging reactive current in the line. It is desirable, therefore, to provide a compensation system to correct for such reactive power in the electrical line.

One conventional device which is adapted to control the switching of the capacitor banks onto and off of the distribution lines are power capacitor controllers. Conventional capacitor controllers switch the capacitor bank into and out of the electrical line on the basis of a number of measurable parameters, such as reactive current, voltage, time or temperature. The methodology of power capacitor controllers is set forth in known publications, such as *The How and Why of Power Capacitor Switching*, Marx, T. (1991), which is herein incorporated by reference, and in U.S. Pat. No. 4,365,190 of Pasternack et al.

One drawback of conventional capacitor controllers is that field personnel must manually set or establish the operational parameters of the controller. These parameters typically include the reactive power or voltage set points which determine when the controller connects or disconnects the capacitor bank onto and off of the line. This process is time consuming, labor intensive, and typically relies upon the relative expertise of the field personnel installing the controller.

Another drawback of conventional capacitor controllers is that the field personnel must independently determine which phase or line of the multi-phase power network is connected to the capacitor controller; a factor that can be important when determining the reactive power of the line.

Still another drawback of conventional power capacitor controllers is that the current sensor, which typically couples one phase of the power network with the controller, may incorrectly determine that the current in the power network is flowing in the reverse direction. This situation arises when the electrical connections of the current sensor are "reverse-wired" or mounted backwards on the line conductor. Consequently, the controller is unable to determine correctly when to connect or disconnect the bank on or off of the distribution line or, alternatively, reverse the electrical connections. One prior solution was to have the field personnel manually disconnect the current sensor and then remount the sensor properly on the line. However, this exposes the field personnel to the high voltage and currents of the power network, thereby increasing the risk of injury.

It would thus be useful to provide a power capacitor controller that automatically adapts to the power network to which it is connected and that automatically controls the capacitor bank of the compensation system.

It is thus an object of this invention to provide a power capacitor controller that allows field personnel having minimal expertise to connect properly the controller to the power line.

Another object of the invention is to provide a power capacitor controller that is relatively low cost and that is relatively easy to install.

Still another object of the invention is to provide a power capacitor controller that is relatively easy to operate and that reduces the risk of injury to field personnel.

Other general and more specific objects of the invention will in part be obvious and will in part appear from the drawings and description which follow.

SUMMARY OF THE INVENTION

This invention attains the foregoing and other objects with a power capacitor controller apparatus and system that adjusts the reactive power of an electrical line by selectively applying a capacitor bank thereto. According to one practice, the system of the invention includes a sensor element for sensing at least a reactive current condition of the line, a switching element and a control element. The switching element can be coupled to the capacitor bank for connecting the bank to the line. According to another practice, the switching element establishes a first line state when the capacitor bank is connected to the line and establishes a second line state when the capacitor bank is disconnected from the line. The control element is associated with the switching element and with the sensor element for selectively operating the switching element to connect and to disconnect the bank on and off the line.

According to one aspect, the control element actuates the switching element to attain a selected succession of the first and second line states. The control element further determines the change in the reactive current of the line in response to at least the sensed reactive current during the selected succession of line states.

According to another aspect, the controller further includes a first threshold determination element for automatically determining a first threshold value of at least the sensed line condition at which the control element operates the switching element to establish the first line state in response to the change in reactive current. The controller also includes a second threshold determination element for automatically determining a second threshold value of at least the sensed line condition at which the control element operates the switching element to establish the second line condition in response to the change in reactive current.

According to another aspect of the invention, the first threshold determination element determines the first threshold when the control element connects the capacitor bank to the line, and the second determination element determines the second threshold when the control element disconnects the capacitor bank from the line.

According to another practice, the control element includes a memory element and a parameter selection element. The memory element stores a program for operating the switching element to connect and alternatively to disconnect the capacitor bank relative to the line according to the programmed sequence to determine at least the reactive current of the line during the sequence. In another aspect, the parameter selection element automatically determines a first set point, e.g., a CLOSE set point, corresponding to a first reactive condition at which the control element operates the switching element to connect the capacitor bank to the line. The selection element also automatically determines a second set point, e.g., a TRIP set point, corresponding to a second reactive condition at which the control element operates the switching element to disconnect the capacitor bank from the line.

According to another practice, the control means determines the size of the capacitor bank in response to at least the reactive current in the line during the programmed sequence.

According to another feature, the invention includes a power capacitor controller system that automatically determines the line phase difference between two lines of a multi-phase distribution system. The capacitor controller system includes a current sensing element for sensing a reactive current condition of one particular line of a multi-line distribution system and for producing a current output signal indicative of this sensed reactive current. The system also includes a voltage sensing element for sensing a voltage condition in one of the electrical lines and for generating a voltage output signal indicative of the line voltage. According to one practice, the system further includes a switch for selectively connecting the capacitor bank relative to the electrical line, and a programmed control element, in circuit with the switch and the line, for automatically actuating the switch selectively to couple the capacitor bank relative to the line to adjust the reactive power thereof. The control element includes a phase determination element for automatically determining the phase between the sensed reactive current and the sensed line voltage in response to at least one of the output signals.

According to another practice of the invention, the control element further includes a compensation element for automatically compensating for the phase difference between the sensed reactive current and the sensed voltage. For example, the current sensor may be connected to a first line of the distribution system and the voltage sensor may be connected to a second, different line. The phase determination element automatically determines the line phase difference between these two lines.

According to another feature, the invention includes a power capacitor controller system that automatically determines the presence of a reverse current condition, as described in further detail below. The capacitor controller system includes a current sensor for sensing a reactive current condition in one line of a multi-line distribution system, and for generating a current output signal indicative of the sensed reactive current in the line. The system also includes a voltage sensor for sensing a voltage condition in one of the lines and for generating a voltage output signal indicative of the voltage of that line. A switch, in circuit with the current sensor and the voltage sensor, selectively connects the capacitor bank on and off the line.

According to one practice of this feature, the capacitor controller further includes a control element for automatically actuating the switch selectively to couple the capacitor bank relative to the line to adjust the reactive power thereof. The control element includes, in one aspect, a memory element for storing at least one of the line conditions and for storing a program sequence that operates the switch in a selected manner to couple selectively the capacitor bank to the line. The control element further includes first and second determination elements, a comparison element, and an adjustment element. The first determination element automatically determines the change in reactive current of the line in response to the current output signal during the program sequence. The first determination element then generates a first value corresponding to the change in reactive current. The second determination element automatically determines the change in line voltage in response to the voltage output signal during the program sequence. According to one practice of the invention, the second determination element generates a second value corresponding to a negative change in line voltage. Consequently, the first and second values are indicative of a reverse current condition.

According to another aspect, the comparison element compares one of the first and second values with either a predetermined voltage value stored in the memory means or a predetermined reactive current value that is also stored in memory. Each predetermined value has a selected compensation phase angle value associated therewith. The control element then determines an appropriate phase angle compensation value indicative of that amount necessary to compensate for the line phase difference from these stored values.

According to still another aspect, the adjustment element automatically adjusts the phase angle of the sensed reactive current by the appropriate phase angle value. According to another practice of the invention, the determination of the first and second values indicate the existence of a reverse current condition in the line.

According to still another feature of the invention, the power capacitor controller automatically determines the existence of a reverse power condition in the distribution system, as described in greater detail below. The capacitor controller system of the invention includes a current sensing element for sensing a reactive current condition in the line and for generating a current output signal indicative of the sensed reactive current. The system also includes a voltage sensing element for sensing a voltage condition in the electrical line and for generating a voltage output signal indicative of the line voltage. A switch element selectively connects the capacitor bank to the electrical line.

According to one aspect of the invention, the power capacitor controller includes a control element that automatically actuates the switch element selectively to couple the capacitor bank to the line to adjust the reactive power thereof. The control element includes a memory element and first and second determination elements. The memory element stores either or both of the measured voltage and reactive current, and also stores a program sequence, e.g., a software program, that operates the switch element in a manner to couple selectively the capacitor bank to the line.

According to another aspect, the first determination element automatically determines a change in the reactive current of the line in response to the current output signal during the program sequence. According to one practice, the first determination element generates a first value when the change in the reactive current is about equal to zero. The second determination element determines the change in line voltage in response to the voltage output signal during the program sequence. The second determination element then generates a second value corresponding to this change in line voltage. According to another practice of the invention, the first and second values generated by the first and second determination elements indicate the presence of a reverse power condition in the line.

According to still another aspect, the memory element stores a first selected voltage level indicative of that line voltage level when the control element connects the capacitor bank to the line; and stores a second selected voltage level indicative of that line voltage when the control element disconnects the capacitor bank from the line. According to yet another practice of the invention, the control element connects the capacitor bank to the line when the line voltage is below the first selected voltage level and disconnects the capacitor bank from the line when the line voltage exceeds the second selected voltage level.

According to still another aspect, the control element further includes a bank connection inhibit element for automatically inhibiting connection of the capacitor bank to the line in response to the first value.

According to still another feature of the invention, the adaptive power capacitor controller determines when a pending capacitor bank switching operation is due to the line effects of the switching operations of multiple capacitor banks. If so, the capacitor controller inhibits the switching of the capacitor bank for a selected period of time. The power capacitor controller system includes a current sensing element for sensing a reactive current in the line and for generating a current output signal indicative of the reactive current. The system also includes a voltage sensing element for sensing a voltage in the electrical line and for generating a voltage output signal indicative of the line voltage. A switch element selectively connects the capacitor bank to the line.

According to one aspect of the invention, the capacitor controller includes a control element that automatically actuates the switch element selectively to couple the capacitor bank to the line to adjust the reactive power thereof. The control element includes a memory element, a determination element, a parameter selection element, a time determination element, and a comparison element. The memory element stores either the measured reactive current or voltage, and stores a program sequence that operates the switch element in a manner to couple selectively the capacitor bank to the line. The determination element automatically determines the change in reactive current of the line during the program sequence.

According to another aspect, the parameter selection element automatically establishes a first selected level, e.g., a first reactive power level, determining connection of the capacitor bank to the electrical line in response to the change in reactive current, and automatically establishes a second selected level, e.g., a second reactive power level, determining disconnection of the capacitor bank from the electrical line in response to the change in reactive current. The time determination element determines the time interval between successive switching operations of the switch means, and the comparison element compares the time interval with a predetermined time interval stored in memory.

According to still another aspect of the invention, the capacitor controller includes an inhibit element for inhibiting connection of the capacitor bank to the line when the time interval is less than the stored predetermined time interval. When the time interval is less than the stored time interval, the pending switching operation is a result of the switching of multiple capacitor banks.

According to yet another aspect of this feature, the capacitor controller includes an adjustment element that adjusts the stored time interval, e.g., the base time interval, between successive switching operations of the switch element by adding a selected time adjustment amount to increase the total time interval between successive switching operations. Consequently, the adjustment element increases the total time that must elapse between switching operations before the controller allows the next, i.e., pending, switching operation to occur.

According to another practice of the invention, when the time between successive switching operations, e.g., between a CLOSE and TRIP operation, is less than the predetermined time, the capacitor controller automatically adjusts one of the reactive power levels, e.g., the TRIP set point, by a selected percentage amount, thus preventing the immediate disconnection of the bank from the line. Correspondingly, the controller adjusts the CLOSE set point since it is proportionally related to the TRIP set point. The controller preferably adjusts the TRIP set point between about 10% and about 35%, and most preferably about 25%.

According to another feature of the invention, the power capacitor controller adaptively and automatically determines the appropriate electrical voltage levels determining connection and disconnection of the capacitor bank to and from the line. The capacitor controller system includes a current sensing element for sensing reactive current in the line and for generating a current output signal indicative of the reactive current. The system also includes a voltage sensing element for sensing the voltage in the electrical line and for generating a voltage output signal indicative of the line voltage. A switching element selectively connects the capacitor bank to the electrical line in response to selected electrical commands.

According to one aspect, the capacitor controller system includes a control element, in circuit with the switch and the line, that automatically actuates the switch selectively to couple the capacitor bank to the line to adjust the reactive power thereof. The control element includes a memory element, a determination element, a voltage selection element, and an inhibit element. The memory element stores either or both of the measured line voltage and the reactive current, as well as stores a program sequence that operates the switch in a manner to couple selectively the capacitor bank to the line. The determination element automatically determines the change in voltage of the line in response to at least the stored voltage condition during the program sequence.

According to another aspect, the voltage selection element automatically establishes a selected voltage value in response to at least the change in line voltage determined according to the program sequence. The selected voltage value is an incremental voltage value that the control element "adds" to the measured line voltage to determine the propriety of performing a switching operation. The incremental voltage value is preferably between about 0.1 volts and about 10 volts. Furthermore, the inhibit element automatically inhibits the control element from operating the switch when a combination of the line voltage and the voltage guard value is outside of a predetermined voltage range that is stored in the memory element. The predetermined voltage range defined by the first selected voltage value and the second selected voltage value is between about 90 volts and about 140 volts for a 120 volt line, and between about 180 volts and about 280 volts for a 240 volt line. According to a preferred practice, the selected voltage values that constitute the voltage range are integrated portions of the software program, i.e., program sequence, that is stored in the memory element.

According to one practice of the invention, the inhibit element includes a first prevention element and a second prevention element. The first prevention element inhibits connection of the capacitor bank to the line when the arithmetic sum of the selected voltage value and the line voltage is greater than a first selected voltage level stored in memory. The second prevention element inhibits disconnection of the capacitor bank from the line when the arithmetic difference between the selected voltage value and the line voltage is less than a second selected voltage value that is stored in memory.

Broadly stated, the power capacitor controller system of the invention includes a sensor for sensing one or more electrical parameters of the line, and a switch, coupled to a capacitor bank, for connecting the bank to the line. The switching element establishes a first line condition when the capacitor bank is connected to the line and establishes a second line condition when the capacitor bank is disconnected from the line. The capacitor controller also adaptively and automatically determines a first threshold value indicative of the capacitor bank connected to the line, and a second threshold value indicative of the capacitor bank disconnected from the line, in response to the electrical parameters sensed by the sensor, when the switch attains the first line condition and when the switch attains the second line condition.

According to another aspect, the invention also includes a power capacitor controller similar to that described above. According to one practice, the current and voltage sensors are separate units that exist independently of the capacitor controller.

According to still further aspects, the invention includes methods for adjusting the reactive power of an electrical line. According to one feature of the invention, the invention includes methods for adaptively and automatically establishing the appropriate electrical levels determining connection and disconnection of the capacitor bank to the line. The method includes sensing one or more electrical parameters of the line, and then selectively connecting the bank to the line to establish a first line condition when the capacitor bank is connected to the line and to establish a second line condition when the capacitor bank is disconnected from the line. The method further includes automatically determining a first threshold value (e.g., a CLOSE set point) indicative of the capacitor bank being connected to the line, and a second threshold value (e.g., a TRIP set point) indicative of the capacitor bank being disconnected from the line. The values are determined in response to the sensed electrical parameters when the first line condition is attained and when the second line condition is attained.

According to another feature of the invention, the method also includes sensing a reactive current condition in a selected line and generating a current output signal indicative of sensed reactive current; sensing a voltage condition in a selected line and generating a voltage output signal indicative of sensed voltage; and automatically determining the selected phase of the sensed reactive current relative to the sensed line voltage in response to at least one of the output signals.

According to another aspect, the method includes the step of automatically compensating for the phase of the sensed reactive current relative to the sensed voltage. According to further aspects of this feature, the method includes the steps of 1) determining at least one of the reactive power and the real power of the set of lines in response to at least one of the current output signal and the voltage output signal, 2) generating a first value indicative of the reactive power and a second value indicative of the real power, 3) storing predetermined phase compensation values associated with predetermined values of the real power and of the reactive power, 4) comparing the first and second values representative of the reactive power and of the real power, respectively, with the stored predetermined power values to determine an appropriate one of the stored phase angle compensation value, and 5) automatically adjusting the phase angle of the reactive current by the appropriate phase angle compensation value.

According to still another feature of the invention, the method includes sensing a reactive current condition in one of the lines and generating a current output signal indicative of sensed reactive current of that line, and sensing a voltage condition in one of the lines and generating a voltage output signal indicative of sensed line voltage of that line. Next, the line conditions and a program sequence are stored, where the program couples selectively the capacitor bank relative to the line. According to another aspect, the method automatically determines a change in the reactive current of the line in response to the current output signal during the program sequence, and generates a first value corresponding to the change in reactive current. The method also automatically determines a change in the voltage of the line in response to the voltage output signal during the program sequence, and generates a second value corresponding to a negative change in the voltage.

According to still another aspect, the method compares at least one of the first and second values with one of a predetermined voltage value and a predetermined reactive current value, each of the predetermined values having a selected compensation phase angle value associated therewith, and wherein the comparison determines an appropriate phase angle value indicative of an amount by which the control means compensates for the phase angle a the method then automatically adjusts the phase angle of the sensed reactive current by the appropriate phase angle value determined according to the above sequence. According to one practice, the first and second values indicate a reverse current condition in the line.

According to still another feature, the method includes the steps of sensing a reactive current condition in the line and generating a current output signal indicative of sensed reactive current, sensing a voltage condition in the electrical line and generating a voltage output signal indicative of sensed line voltage, selectively connecting the capacitor bank relative to the electrical line, and to adjust the reactive power thereof, and storing at least one of the line conditions and for storing a program sequence that couples selectively the capacitor bank relative to the line. According to one aspect of this feature, the method automatically determines a change in the reactive current of the line in response to the current output signal during the program sequence, and generates a first value when the change in the reactive current is about equal to zero. Furthermore, the method automatically determines a change in the voltage of the line in response to the voltage output signal during the program sequence, and generates a second value corresponding to the change in the voltage. Thus, the first and second values indicate a reverse power condition in the line.

According to another aspect, the method of this feature further includes the step of 1) storing a first selected voltage level determining connection of the capacitor bank to the line and storing a second selected voltage level determining disconnection of the capacitor bank from the line, and 2) automatically determining connection of the capacitor bank to the line when the line voltage is below the first selected voltage level and determining disconnection of the capacitor bank from the line when the line voltage exceeds the second selected voltage level. Further aspects include the step of automatically inhibiting connection of the capacitor bank relative to the line in response to the first value.

According to yet another feature of the invention, the method includes the steps of sensing a reactive current condition in the line and generating a current output signal indicative of sensed reactive current; sensing a voltage condition in the electrical line and generating a voltage output signal indicative of sensed line voltage; and storing at least one of the line conditions, as well as a program sequence that selectively couples the capacitor bank relative to the line. Another aspect of the method includes automatically determining a change in the reactive current of the line during the program sequence in response to at least one of the stored line conditions to automatically establish a first selected level determining connection of the capacitor bank relative to the electrical line, and to automatically establishing a second selected level determining disconnection of the capacitor bank from the electrical line.

According to still another aspect, the method includes the step of determining a first time interval between successive switching operations, and comparing the first time interval with the predetermined time interval. According to one practice, the method further includes the step of inhibiting connection of the capacitor bank relative to the line was the first time interval is less than the stored predetermined time interval. Still further aspects include the step of adjusting the time interval between successive switching operations of the capacitor bank by adding a selected time adjustment amount to increase the time interval between the successive switching operations.

According to still further features of the invention, the method includes the step of sensing a reactive current condition in the line and generating a current output signal indicative of sensed reactive current; sensing a voltage condition in the electrical line and generating a voltage output signal indicative of sensed line voltage; selectively connecting the capacitor bank relative to the electrical line to adjust the reactive power thereof; and storing at least one of the voltage condition and the reactive current condition, and storing a program sequence that selectively couples the capacitor bank to the line.

The method also automatically determines a change in the line voltage of the line in response to at least the stored voltage condition during the program sequence. Consequently, the method automatically establishes a selected voltage value in response to at least the change in line voltage determined according to the program sequence, and automatically inhibits connection of the capacitor bank to the line when a combination of the line voltage and the voltage value is outside of a predetermined voltage range.

The method further includes the steps of preventing connection of the capacitor bank to the line when the arithmetic sum of the selected voltage value and the line voltage is greater than a first selected voltage level stored in the memory means; and preventing disconnection of the capacitor bank from the line when the arithmetic difference between the selected voltage value and the line voltage is less than a second selected voltage value stored in the memory means.

Other general and more specific objects of the invention will in pan be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same pans throughout the different views. The drawings illustrate principles of the invention and, although not to scale, show relative dimensions.

DESCRIPTION OF THE ILLUSTRATED EMBODIMENTS

Figure 1:
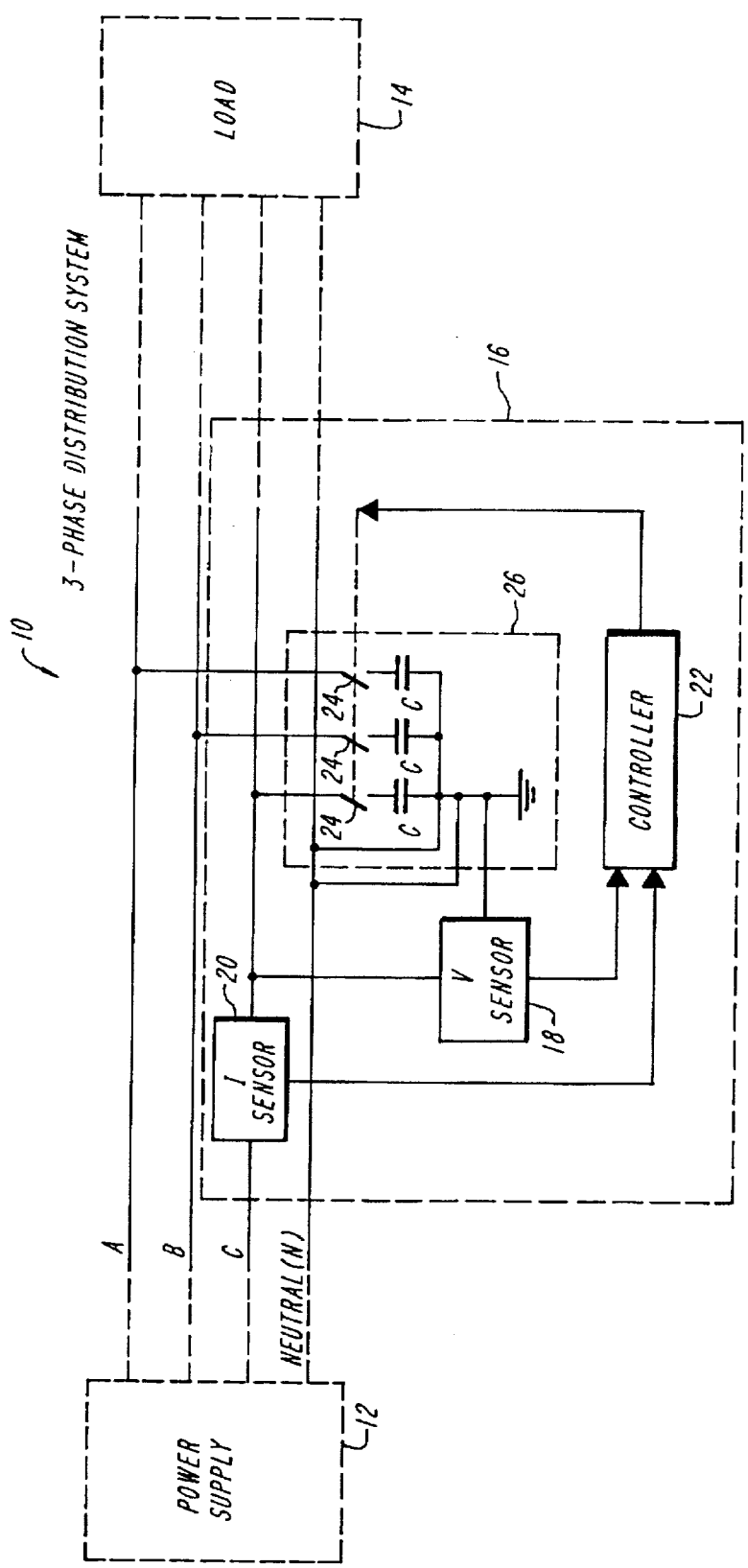
FIG. 1 is a schematic block diagram of the adaptive power capacitor controller of the present invention connected to a three phase distribution system.

FIG. 1 shows a block diagram of the adaptive power capacitor controller system of the present invention. A three-phase distribution system 10 having a plurality of electrical lines, denoted as A, B, C, and Neutral (N), carry real and reactive power to a load 14 typically located downstream of the capacitor control stage 16, i.e., to the right. The illustrated distribution system is a Wye-type system, which is a typical line arrangement for power distribution systems. The electrical lines A–N are typically energized by a substation or power plant 12 that is typically located upstream of the control stage 16, i.e., to the left. The control stage includes a voltage sensor 18 and a current sensor 20 that are coupled to a selected phase, e.g., electrical line C, of the distribution system. The current and voltage sensors are coupled to an adaptive controller stage 22, which is coupled to a capacitor bank 26 having a plurality of capacitors C and switches 24 that are coupled to each phase of the illustrated distribution system 10. Those of ordinary skill will recognize that the current and voltage sensors 20 and 18, respectively, need not be connected to the same line phase, and can individually be connected to different lines.

The illustrated controller stage 22 has loaded thereon software code that operates the controller to automatically adapt to the distribution system 10 to which it is connected. The controller 22 thus is capable of adaptively and automatically determining its operational set points, among other features, without requiring field personnel to manually establish these points. The controller is also capable of automatically determining its operational set points during "abnormal" operating conditions. The term "abnormal" operating condition is intended to include those conditions that occur other than when the controller operates under normal line conditions and/or with a stable load. Examples include reverse power line conditions, conditions when the controller is connected to a "stiff" line, e.g., the conductor has a relatively large diameter and/or the power source has a relatively low impedance, when the capacitor bank malfunctions, and when the controller wiring establishing the VAR operational set points is reversed.

Figure 2:
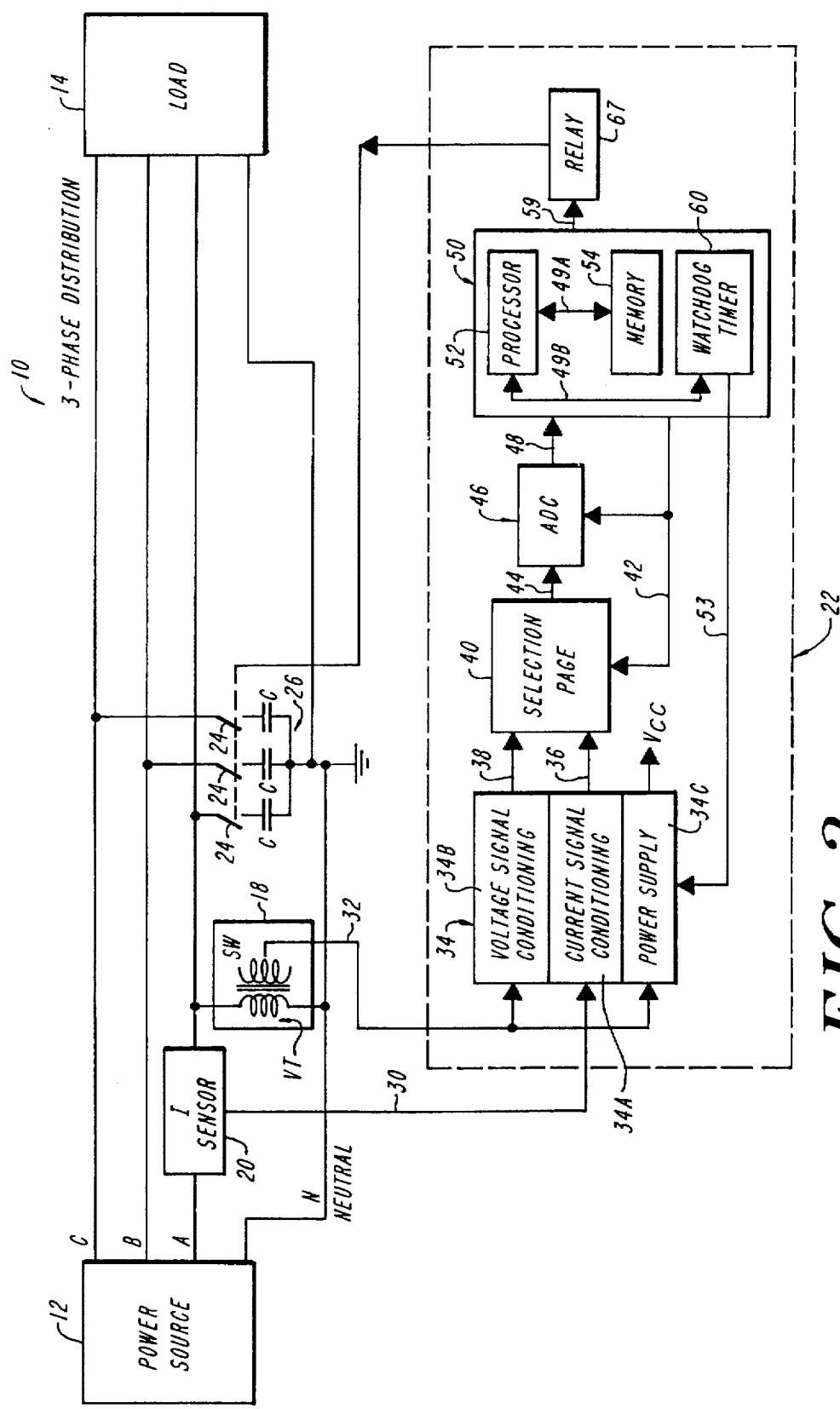
FIG. 2 is a more detailed schematic block diagram of the adaptive power capacitor controller of FIG. 1.

With reference to FIG. 2, the current sensor 20 measures the alternating current in a particular line, for example, electrical line A. The sensor in turn generates an analog output current signal that is directly proportional to the current in the line. The current output signal electrically communicates with the controller stage 22 via conductor 30. The current sensor 14 can be of any conventional type, such as conventional current transformer or current sensors that sold under the trade designation Series 1301 POWER-FLEX® line post sensor, by Fisher Pierce, Weymouth, Mass., U.S.A.

The illustrated voltage sensor 18 is also coupled to electrical line A and measures the voltage in this line. The voltage sensor 18 produces an analog voltage output signal that is directly proportional to the voltage in the line. The voltage output signal is coupled to the controller stage 22 via conductor 32. The illustrated sensor employs a conventional voltage transformer VT coupled between an electrical line and neutral to measure the line voltage and to produce the analog voltage output signal. The voltage transformer VT is preferably a step-down transformer that provides a suitable and manageable level of voltage while electrically isolating the controller stage 22 from the distribution system. Voltage sensors in general, and voltage transformers in particular, are art known, and need not be elaborated upon here.

The illustrated controller stage 22 preferably includes a signal conditioning stage 34, a selection element 40, a converter element 46, and a controller 50. The signal conditioning stage 34 preferably comprises a current conditioning portion 34A, a voltage conditioning portion 34B, and a power supply 34C. The current conditioning portion 34A is connected to receive the current output signal generated by the current sensor 20 on conductor 30. The illustrated conditioning portion 34A produces a corrected current output signal that is substantially identical, harmonic-wise, to the line current, but with a known angle displacement, e.g., 90 degrees. This angle displacement is an inherent characteristic of inductive sensors. The output conditioned current signal generated by the current conditioning portion is transferred along conductor 36 to the selection element 40.

Likewise, the voltage conditioning portion 34B is connected to receive the voltage output signal generated by the voltage sensor 18 on conductor 32. The illustrated voltage conditioning portion amplifies the measured line voltage and filters out high frequency electrical noise created by carrier current or other like electrical perturbations. The current and voltage conditioning portions 34A and 34B are known art, and exist as portions of the commercially available capacitor controllers sold under the trade designation POWERFLEX®, by Fisher Pierce, Weymouth, Mass., U.S.A. Thus, the conditioning portions need not be elaborated upon herein.

The power supply portion 34C of the conditioning stage 34 is connected to receive a selected level of voltage from the secondary windings SW of the voltage transformer VT forming the voltage sensor 18. The illustrated power supply 34C converts, at least partially, the analog output voltage signal generated by the transformer VT on conductor 32 into a dc voltage. This voltage provides power to the electrical components of the controller stage 22 and thus functions as the Vcc of the controller stage 22.

With further reference to FIG. 2, the selection element 40 is connected to receive the conditioned current and voltage signals along conductors 36 and 38, respectively. The selection element 40 preferably is a multiplexer that responds to a control signal on conductor 42 generated by the controller 50. The controller 50 selects the particular output signal that passes along conductor 44 by establishing a selected potential, e.g., a logic high or a logic low, at one or more address bits of the multiplexer. For example, the selected potentials provided at the control input of the multiplexer determine which input signal, e.g., the conditioned current or voltage signal, appears at the output of the multiplexer. The operation and function of multiplexers are known to those of ordinary skill in the art.

Referring again to FIG. 2, the illustrated converter element 46 includes a sample-and-hold circuit that obtains instantaneous samples of the selected analog output signals passed along conductor 44. The circuit typically includes a capacitive storage element that holds, i.e., samples, the selected analog signal. The converter element further includes an analog-to-digital converter that converts the sampled analog signal to a digital signal suitable for use by the controller 50. The digital signal is transferred as an electric digital signal to the controller 50 along output conductor 48. Analog-to-digital converters and sample-and-hold circuits are known to those of ordinary skill, and need not be described further.

Although illustrated as separate elements, those of ordinary skill will recognize that the selection element 40 and the converter element 46 can be an integrated portion of the processor of the controller. According to a preferred practice of the invention, the selection element 40 and the converter element 46 are an integrated part of the controller 50.

The illustrated controller 50 preferably includes a processor 52, a resident memory element 54, and a timing element 60. The controller 50 is in electrical communication with the converter element 46, the selection element 40 and the power supply 34C. The controller 50 determines the output of the multiplexer 40 by generating and passing a signal along conductor 42 to the address bits of the multiplexer. The controller 50 is also in electrical communication with the converter element 46 by generating and passing signals to the converter 46 along conductor 42.

The processor 52 is coupled to the memory element or module 54 via conductor 49A and to the timer element 60 via conductor 49B. The illustrated processor 52 receives and processes the binary output digital signal of the converter 46.

The processor 52 of the controller 50 further accesses software code loaded in the memory element 54 along conductor 49A, that determines the operation and function of the controller stage 22. Specifically, the software code allows the controller 50 to perform a number of adaptive and automatic functions, as described in greater detail below. Those of ordinary skill will recognize that the memory element 54 can include a plurality of separate memory modules. For example, the software code can be preloaded on a first module and the controller can store selected line parameters in another module.

The illustrated timer element 60 preferably includes a watchdog timer 62 that is coupled to the power supply 36 of the conditioning stage 34 via conductor 53 and with the processor 52 along conductor 49B. The watchdog timer 60 is a fail-safe logic device that restarts the controller in the event of a power failure, faulty logic operation, or faulty program execution. Thus, the watchdog timer 60 resets the processor 52 or interrupts the processor's normal functions when one of the above events occurs. Watchdog timers in the art and need not be described in detail herein. Additionally, those of ordinary skill will recognize that the timer 62 need not directly communicate with the processor 52.

Referring again to FIG. 2, the controller 50 output signal is coupled to relay 67 via output conductor 59. The illustrated relay 67 includes a pair of momentary relays which are in electrical communication with the switches 24 of the capacitor bank 26. Each momentary relay of the pilot relay 66 includes a relay coil and a single normally-open contact. According to one practice, the controller 50 connects the capacitor bank 26 to the distribution system by generating a prolonged pulse having a selected duration, e.g., ten seconds, which energizes the coil of one of the relays and closes the normally-open contact thereof. Specifically, each capacitor C of the illustrated capacitor bank 26 is connected simultaneously to each phase of the distribution system 10. After the controller 50 terminates the pulse, the contact of the momentary relay then reverts to its normally-open position.

Conversely, the controller 50 disconnects the capacitor bank 26 from the distribution system 10 by pulsing the other momentary relay for a selected duration, e.g., ten seconds. This pulse energizes the relay coil of that momentary relay and closes its normally-open contact, allowing the controller to disconnect the capacitor bank 26 from the line by opening the high voltage switches 24.

In another embodiment, the switching element can include a single latching relay instead of the pair of momentary relays, or can include other switching devices, such as solid state devices.

The capacitor bank 26, when connected to the line, changes the reactive current thereof by adding a selected amount of leading reactive current thereto. The amount of the leading reactive current added to the line depends upon the size of the capacitor bank, for example, the larger the capacitor bank the greater the amount of reactive current added to the line. This leading reactive current compensates for the lagging reactive current introduced to the line by commercial and residential inductive loads, e.g., air conditioners and like inductive loads. The addition of leading reactive current to the line by the capacitor bank reduces the energy loss in the line caused by the heating of the line conductors by the reactive component of the inductive load. Consequently, the larger the size of the capacitor bank, the greater the amount of leading reactive current added to the distribution system, and the greater the reduction in unwanted power dissipation.

The reduction in the amount of lagging reactive current in the line by the addition of capacitors to the line also reduces the total line current, which has a number of important benefits. First, the peak allowable loading of the three-phase distribution system 10 is increased. Second, the effective ampacity of the line is increased, allowing the same distribution system to carry larger amounts of current. Third, the reduction in line losses created by heating of the line conductors increases the operating life of the lines and of the associated electrical components, such as transformers and other related equipment.

Importantly, switching the capacitor bank 26 on line increases the line voltage both upstream, i.e., between the power source 12 and the control stage 16, and downstream, i.e., between the control stage 16 and the load 14, of the control stage 16. However, the addition of the capacitor bank to the line decreases the lagging reactive current in the line only upstream of the line.

Advantageously, the adaptive power capacitor controller 16 of the present invention interrogates the three-phase distribution system 10 to determine selected electrical line parameters and to perform automatically selected controller functions or mode of operation. The controller automatically performs these functions by accessing and executing a selected software, are program that is loaded in the memory 54 of the controller 12 in the conventional manner.

Inexperienced field personnel often limit the ability of the power capacitor controller to reduce effectively line losses and to improve the voltage profile of the line, i.e., by increasing or decreasing the line voltage, because they incorrectly set or establish the controller operational set points. Typically, field personnel establish these set points by hand. The controller of the present invention addresses these and other problems by adapting itself to any line of the distribution system to which it is associated with, and by automatically establishing, without manual input, the operational parameters of the controller during both normal and abnormal line conditions.

The controller of the present invention is thus capable of performing a number of adaptive and/or automatic functions including 1) adaptively and automatically establishing the line phase angle correction value; 2) adaptively and automatically establishing the appropriate electrical levels determining connection and disconnection of the capacitor bank relative to the line; 3) adaptively and automatically establishing appropriate guard voltage levels determining connection and disconnection of the capacitor bank relative to the line; 4) automatically determining when the capacitor bank is inoperative; 5) automatically determining when a reverse power line condition and a reverse current line condition exists; 6) automatically determining when a capacitor bank switching operation is a result of multiple capacitor banks on the line, and 7) automatically determining when the operational set points of the controller are reversed. The adaptive features of the present invention can be separately and independently enabled by specific software code that forms part of the stored program. The controller can thus perform one or more of the foregoing adaptive features, as well as perform one or more of the forgoing automatic features of the invention.

Figure 3:
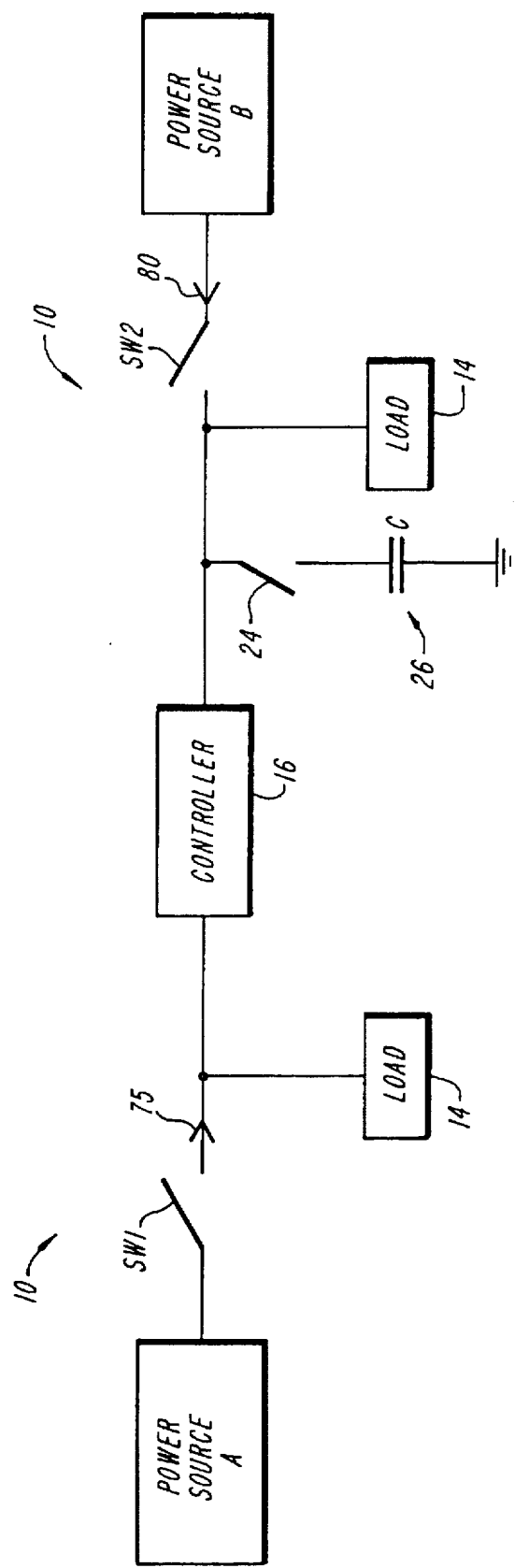
FIG. 3 is a schematic block diagram of the controller of FIG. 1 connected to a distribution line during a reverse power line condition.

The term "reverse current" is defined as that line condition that exists when the current sensor 20, FIG. 1, is connected to the line such that the positive and negative conductors of the sensor are mounted to the line in a reverse manner. Consequently, the sensor 20 measures a negative or reverse current flow in the line. The term "reverse power" is defined as that line condition that exists when the current sensor is downstream, rather than upstream, of the capacitor bank relative to the current flow in the line. Consequently, the current sensor, and thus the controller 50, is incapable of measuring and recording the reactive current of the bank. This abnormal line condition is illustrated in FIG. 3. Under normal line operating conditions, switch SW1 is closed and power source A supplies power (shown by arrow 75) to the load 14, the control stage 16, and the capacitor bank 26 via the three-phase distribution system 10. The current sensor portion of the control stage 16 is thus disposed upstream of the capacitor bank 26 relative to the current flow, FIG. 2. Under certain circumstances, such as when a fault occurs in the line, switch SW1 opens, switch SW2 closes and power source B supplies the operating power (shown by arrow 80) to the distribution system 10 rather than power source A. When this condition exists, the current sensor 20 of the control stage 16 which previously was located upstream of the capacitor bank, i.e., located between power source A and the control stage 16, is now located downstream of the capacitor bank in relation to the power source B power flow. Hence, the controller cannot determine the reactive current of the capacitor bank.

Figure 4A:
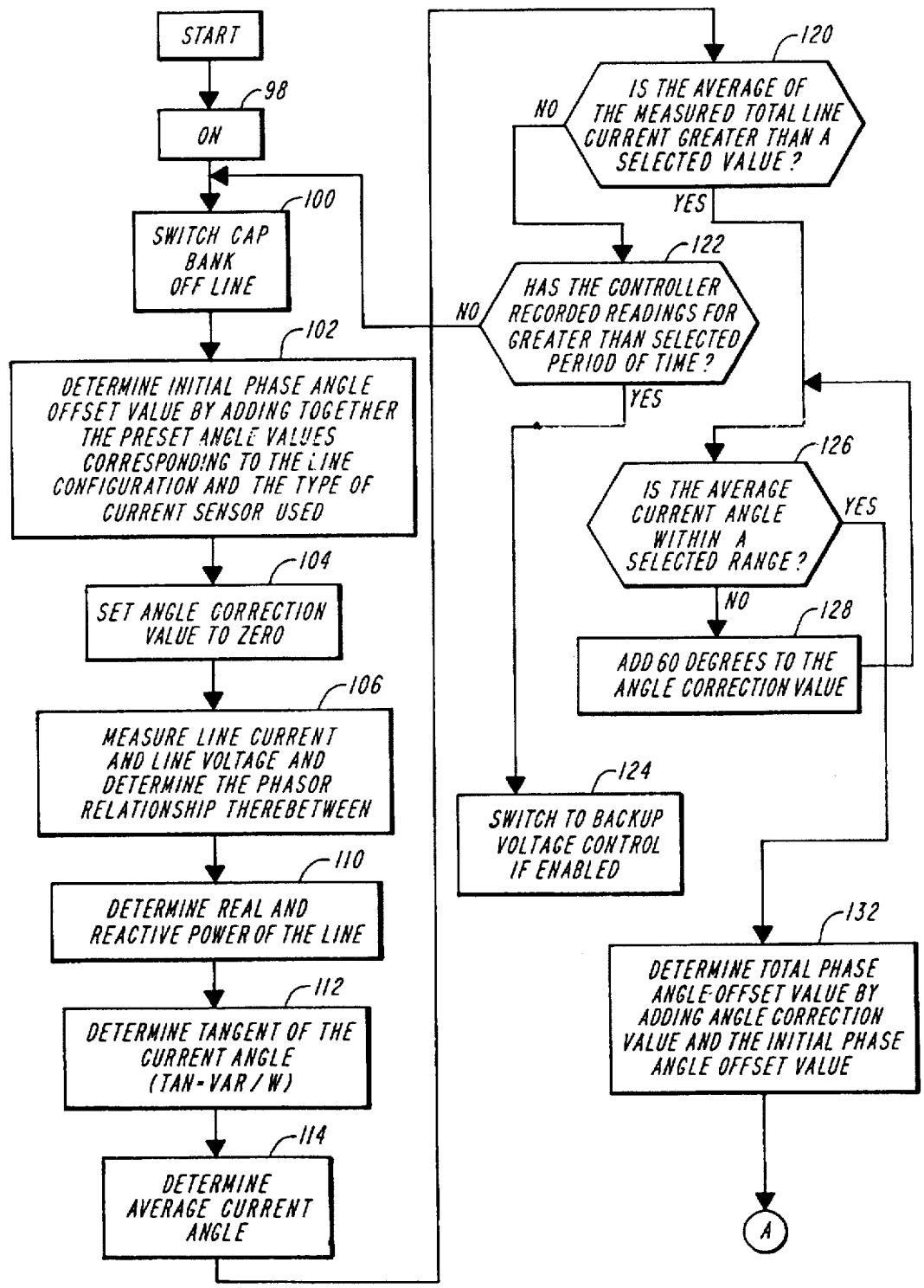
FIG. 4A is a flow chart diagram detailing the preferred process in accordance with the present invention for adaptively and automatically establishing the appropriate offset value to compensate for the various line phases of the distribution system of FIG. 1.

FIG. 4A shows an illustrated flow diagram of operations of the power capacitor controller to determine adaptively and automatically the appropriate total line phase-angle correction or offset value required to offset the line phase difference between the current sensor and the voltage sensor. More specifically, the total correction phase angle value determined by the controller corresponds to the difference in line phase between the line current sensed by the current sensor and the line voltage sensed by the voltage sensor for any particular line configuration, e.g., for both Wye and delta line configurations. Consequently, the controller can accurately determine selected electrical parameters of the distribution system regardless of the particular line, e.g., lines A, B or C, to which the current and voltage sensors are connected. The controller can also determine the existence of reverse current, i.e., a current signal wiring error, and the difference in line phase.

According to one practice of the invention, the total phase angle offset value determined by the sequence of FIG. 4A includes three phase angle offset compensation components. These phase angle components include a phase angle component addressing the particular line phase rotation; a phase angle component addressing the wiring direction of the current sensor; and a phase angle component addressing the particular line phase that is coupled to the current sensor.

Referring specifically to the flow diagram of FIG. 4A and to action box 98, the flow logic begins with determining if the phase angle adaptive feature of the invention is enabled. If so, the controller disconnects the capacitor bank from the line, as illustrated in action box 100. The controller then proceeds to action box 102 and determines the phase angle component corresponding to the particular line configuration and the phase angle component corresponding to the type of current sensor and its associated wiring direction. The arithmetic combination of these two values represents the initial phase angle offset value. The current sensor-type phase angle offset component and the angle component corresponding to the line configuration are preloaded in the memory module 54, FIG. 2, as part of the computer program. The particular types of current sensors compatible with the power capacitor controller of the present invention and the phase angle offset values associated therewith are readily ascertainable by one of ordinary skill. Illustratively, several types of current sensors having a corresponding phase angle offset values are compatible with the illustrated power capacitor controller. For example, conventional current transformers have a zero degree phase angle offset value, and the Series 1301 standard POWERFLEX® current sensor and commercially available from Fisher Pierce, Weymouth, Mass., U.S.A., have a ninety degree phase angle offset value.

The line configuration phase angle offset component is also preloaded in the memory module 54. According to one practice of the invention, the preloaded phase angle value associated with a Wye-type line configuration is zero degrees, and the preloaded phase angle value associated with a delta-type line configuration is thirty degrees.

Referring again to FIG. 4A, after determining the phase angle offset values for the particular line configuration and for the type of current sensor employed with the controller, the controller then sets another phase angle correction value representative of the third component of the total phase angle offset value, to zero. This phase angle correction value is that angle value that is added to the initial phase angle offset value to correct or adjust for the difference in line phase between the sensed line current signal and the sensed line voltage. This value is described in greater detail below.

In accordance with action box 106, the controller determines the line current via the current sensor 20 and the line voltage via the voltage sensor 18. The controller then determines the phasor relationship between the current and voltage signals to determine the power phase angle therebetween. A positive phase angle between the signals is indicative of an inductive load and is exemplified by the current lagging the voltage. Conversely, a negative phase angle between the signals is indicative of a capacitive load, and is exemplified by the current leading the voltage. In accordance with box 110, the controller determines the real power, typically measured in watts (W), and the reactive power, typically measured in volt-amperes- reactive (VARS), of the line from the current measured by the current sensor.

In accordance with action box 112, the controller via the stored software code determines the current angle of the complex power of the electrical line. The current angle is geometrically defined as the ratio of the reactive power to the real power (VAR/W). Those of ordinary skill will recognize that the current angle is related to the tangent of the phase angle, as determined from known power system graphical methods, such as power triangles.

The controller then determines the average current angle, in accordance with action box 114, by determining the real and reactive power of the line during a selected time interval, such as ten minutes. During this interval, the controller records the measured line voltage and current and then determines the average current angle from these readings.

Decision box 120 illustrates a determination by the controller whether the average of the total line current is greater than a selected value, such as five amps as measured in the primary of the current sensor. By examining the average line current, the controller can determine which current readings are above the selected value, and thus represent normal line readings. If the average of the total line current is less than the selected value, the controller then determines whether it has recorded selected electrical parameter readings, such as current and voltage, for a selected period of time, e.g., eight days, as illustrated in decision box 122. Control then branches to action box 124 if the line parameter recordal period exceeds 8 days, or branches backward in the sequence to action box 100 if the period is less than 8 days. When the parameter recordal period exceeds 8 days, the controller switches to back-up voltage control, if enabled. Back-up voltage control is described in greater detail below. According to one practice of the invention, the controller terminates the illustrated adaptive angle function often determining whether the back-up voltage control is enabled.

Referring again to FIG. 4A, and specifically to decision box 120, the controller branches to decision box 126 when the average total line current exceeds the predetermined selected threshold value. Decision box 126 illustrates the controller determining whether the average current angle is within a selected range of values, such as between 23 degrees level and 37 degrees lag. Control branches to action box 128 if the average current angle is not within the selected range of values. The illustrated action box 128 "adds" a selected value, e.g., 60 degrees, to the average current angle value and then returns control to decision box 126. The term "add" is intended to include the controller examining the measured line current and voltage in 60 degree increments in accordance with the parameters of the software code.

The addition of a selected multiple of sixty degrees to the current angle compensates for the line phase difference, if any, between the measured line current and the measured line voltage. This difference typically arises when the current and voltage sensors are connected to different electrical lines, e.g., the current sensor is connected to line A and the voltage sensor is connected to line B. This selected line phase increment also accounts for all possible combinations of line phases, while addressing the effect the electrical load has on the line phase angle of the distribution system. The illustrated electrical load affects the measured phase angle between the line voltage and current by introducing a phase shift to the current, which can exceed thirty degrees. Consequently, examining the average current angle within sixty degrees helps prevent phase angle miscalculations that arise from the foregoing line phase combinations and from the phase angle of the load.

The selected sixty degree phase increment further allows the controller to accurately determine the appropriate phase angle between the measured line voltage and current during reverse current line conditions, since this condition affects the proper phase angle determination. During reverse current line conditions the current sensor measures a negative current signal, i.e., senses a 180 degree shift in the sensed current signal. The controller can thus compensate for this phase shift by selectively adding phase angle increments to the current angle.

The controller then determines the third component of the total phase angle offset value by determining the selected multiple of sixty degrees that required to maintain the average current angle within a selected range.

In accordance with action box 132, the controller then combines this third angle offset component value with the initial phase angle offset value determined at the beginning of the sequence to establish the total phase angle offset value.

Figure 4B:
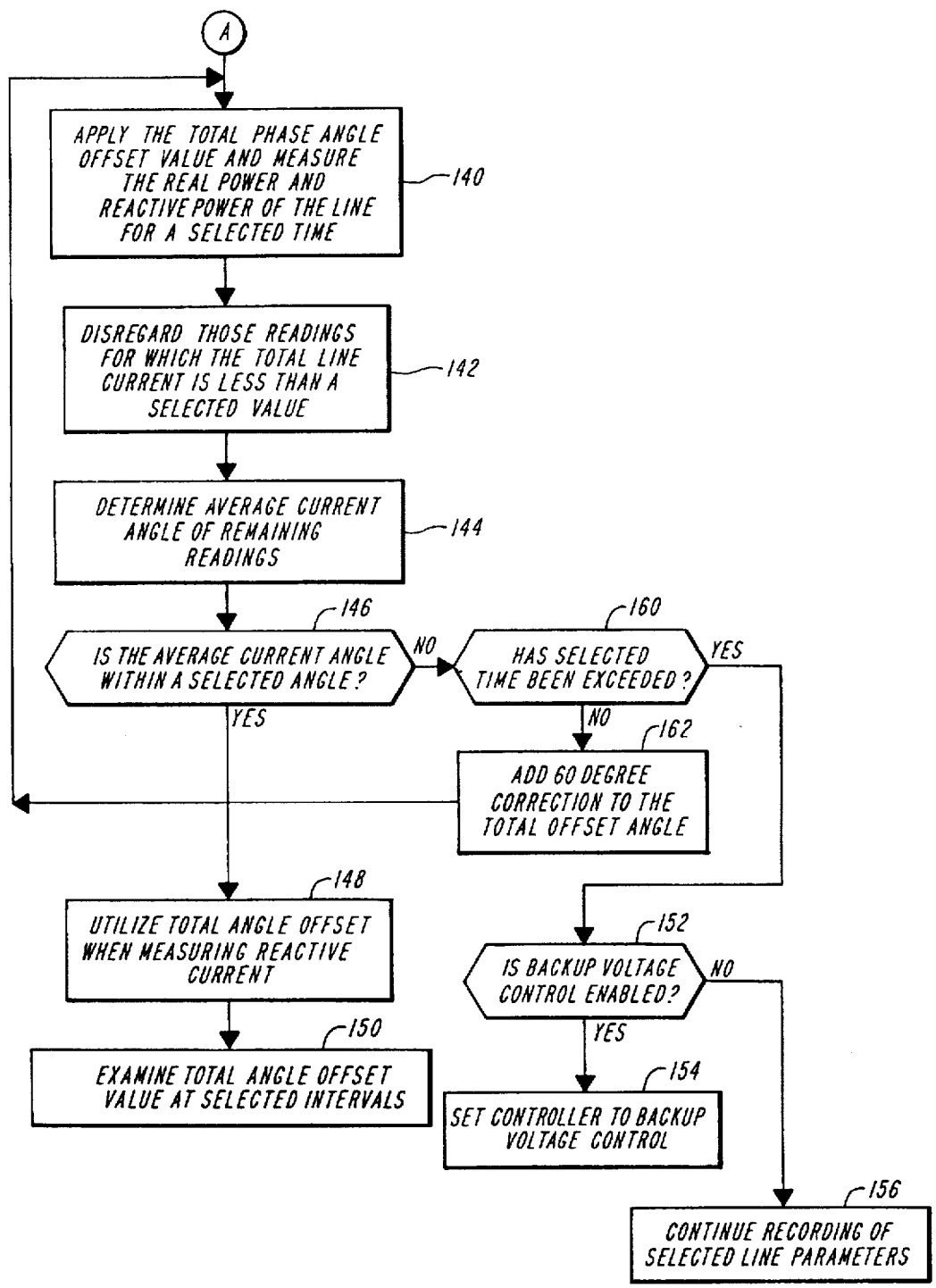
FIG. 4B is a continuation of the flow chart diagram of FIG. 4A detailing the preferred process in accordance with the present invention for adaptively and automatically establishing the appropriate offset value to compensate for the various line phases of the distribution system of FIG. 1.

FIG. 4B illustrates the continuation of the sequence of FIG. 4A. Action box 140 illustrates that the controller utilizes the total phase angle offset value determined in accordance with the sequence of FIG. 4A when determining the real and reactive power of the line. The total phase angle offset value allows the controller to determine accurately selected electrical parameters of the line without regard to the particular line phase to which the current and voltage sensors are connected. According to one practice, the controller records the real and reactive power of the line for a selected period of time, e.g., twenty-four hours. This one power me is performed to obtain a load power measurement in which unusual loading conditions, such as the connection of light loads at night, are averaged with load measurements that are obtained during normal line conditions.

Action boxes 142 and 144 illustrate that the controller determines the total line current, and disregards those line current readings that are less than a selected value. Current readings that are less than the selected value are indicative of abnormal line conditions, such as those created by light loads. The controller then determines the average current angle of the remaining readings.

Decision box 146 shows that the controller determines whether the average angle offset value is within selected limits, e.g., between about zero degrees lag and about sixty degrees lag. This sequence checkpoint ensures that the controller is not employing erratic line readings caused by an abnormal loading condition to determine the total phase angle offset value.

Referring again to FIG. 4B, control branches to action box 148 when the offset value is within a selected range. The controller thus utilizes the total angle offset value during routine measurements of selected electrical parameters, such as reactive current. The controller then repeatedly monitors or "polls" the line in accordance with action box 150 to ensure that the previously calculated total angle offset value is correct or to determine a new phase angle offset value.

Conversely, logic flow control proceeds to decision box 160 when the average angle offset value is not within the selected range. External occurrences that may affect the accuracy of the total angle offset value and place it outside the selected range include a reverse current line condition and the removal and subsequent reinstallation of the controller at a different location. The decision box 160 determines whether the controller has completed the twenty-four hour test cycle. If not, then control branches to action box 162 where the controller adds another sixty degrees correction value to the total. This added phase angle offset compensates for any abnormal condition that arises during the selected period. Control then proceeds back to action box 140.

When the time has exceeded the twenty-four hour period, control proceeds to decision box 152, which illustrates a determination by the controller regarding whether back-up voltage control is enabled. If the voltage control is enabled, control branches to action box 154 which sets the controller to back-up voltage control. Alternatively, if the back-up voltage control is disabled, the controller continues to record selected electrical line parameters. The parameters that are typically recorded and utilized by the controller are the voltage and current readings, since the reactive current readings are invalid due to the existence of abnormal line conditions.

A significant feature of the adaptive phase angle feature of the invention is that it does not require field personnel to determine initially the exact line phase to which the current and voltage sensors are attached. Rather, this feature adaptively and automatically compensates for the line phases of the current and voltage sensors by determining the appropriate phase angle offset value. Additionally, this feature does not necessitate the determination of the line phases of each sensor by field personnel prior to installation of the controller to the line. Another significant feature of the adaptive phase angle mode is that it provides the field personnel with a power capacitor controller that is easily and readily installed at any particular line location.

Figure 5A:
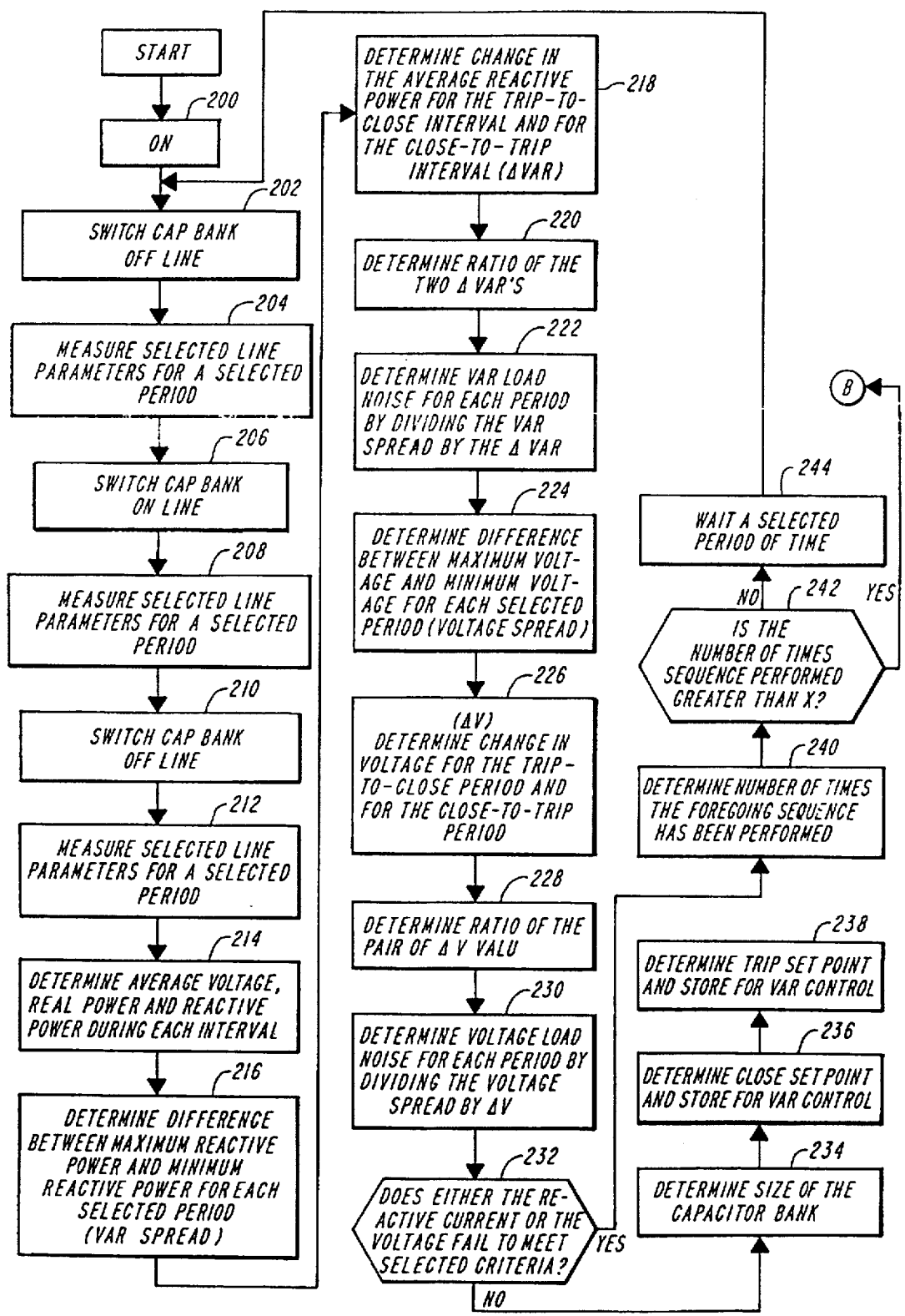
FIG. 5A is a flow chart diagram detailing the preferred process in accordance with the present invention for adaptively and automatically establishing the operational set points of the power capacitor controller of FIG. 1.

FIG. 5A shows an illustrated flow diagram of operations of the power capacitor controller to determine adaptively and automatically the reactive power (VAR) operational set points of the controller, as well as to determine automatically the size of the capacitor bank. The adaptive operational set point feature of the invention includes the automatic determination of the CLOSE set point, i.e., the point at which the controller connects the capacitor bank to the line, and the TRIP set point, i.e., the point at which the controller disconnects the capacitor bank from the line. The set points are measured in reactive current or reactive power, either of which is suitable for use with the present invention. For purposes of clarity, the set points are identified hereinafter as being measured in reactive power, although they can also be measured in reactive current.

Reactive current/power is the most appropriate line parameter for determining whether the capacitor bank connects to or disconnects from the line. Significantly, the size of the capacitor bank determines the level of reactive current added to the line. Thus, the illustrated controller switches the capacitor bank on and off the line at the most electrically efficient times.

Logical flow in the illustrated sequence of FIG. 5A begins at box 200 and proceeds to action box 202 where the controller switches the capacitor bank off line. Control then proceeds to action box 204 where the controller determines the values of selected line parameters, such as reactive power and line voltage, during a selected period of time, e.g., thirty seconds. The controller then switches the capacitor bank on line in accordance with action box 206. Again, pursuant to box 208, the controller determines the values of selected electrical line parameters, such as reactive power and line voltage, for a selected period of time, e.g., thirty seconds. As illustrated in action boxes 210 and 212, the controller switches the capacitor bank off line, and then determines the values of selected line parameters for a set duration, e.g., thirty seconds. This particular switching sequence establishes a history of certain line parameters for subsequent use by the controller in determining its operational set points. Specifically, the controller adaptively and automatically establishes its operational set points by establishing a recording history of changes in selected line parameters when the capacitor bank is switched on and off the line.

As illustrated by action box 214, the controller determines the average voltage, real power, and reactive power during each selected time interval. The controller further determines the VAR spread, in accordance with action box 216, by determining the difference between the average maximum and minimum reactive power values recorded during each interval.

Referring again to FIG. 5A, action box 218 illustrates that the controller determines the change in the reactive power ($\Delta$VAR) of the line during each time interval defined by the TRIP-to-CLOSE interval (action boxes 204 and 208) and by the CLOSE-to-TRIP interval (action boxes 208 and 212). In accordance with action box 220, the controller then determines the ratio of the two $\Delta$ VAR readings to ensure that the line is operating under stable loading conditions. As shown in action box 222, the controller arithmetically divides the value associated with the VAR spread with the value associated with the $\Delta$ VAR reading to determine the noise due to changes in reactive power in the line during each time interval, e.g., during each thirty second time period.

The controller then performs the same sequence to determine selected voltage values. In action box 224, the controller further determines the voltage spread by determining the difference between the average maximum and minimum voltage values from each period, e.g., during each thirty second period. Action box 226 illustrates that the controller then determines the change in the voltage ($\Delta$V) of the line during each time period defined by the TRIP-to CLOSE interval (action boxes 204 and 208) and by the CLOSE-to-TRIP interval (action boxes 208 and 212). In accordance with action box 228, the controller then determines the ratio of the two $\Delta$V readings to ensure that the line is operating under normal loading conditions. As shown in action box 230, the controller arithmetically divides the value associated with the voltage spread with the value associated with the $\Delta$V reading to determine the noise due to voltage changes in the line during each time period, e.g., during each thirty second time interval.

Decision box 232 illustrates that the controller determines whether the foregoing calculated voltage and reactive power readings are within predetermined limits. For example, with regard to reactive power, the controller establishes whether the readings obtained by the illustrated sequence fail to meet selected criteria by determining whether 1) either $\Delta$VAR reading is less than a selected value including sign; or 2) the $\Delta$VAR ratio is outside of a predetermined range of values, such as between 0.8 and 1.2; or 3) the calculated VAR noise is greater than a specified value, e.g., 0.2. Reactive power values outside of this range are indicative of rapidly changing loads, or an inoperative bank, or a reverse power line condition. According to one practice of the invention, the controller determines that the voltage readings fail to meet selected criteria by determining whether 1) either $\Delta$V value is within a selected range of voltage values including sign, e.g., between 0.1 V and 17 V; or 2) the $\Delta$V ratio is outside of a selected range of voltage values, such as between 0.8 V and 1.2 V; or 3) the calculated voltage noise is greater than a specified value, e.g., 0.2. Likewise, voltage values outside of this range are indicative of rapidly changing line voltages, or the presence of a stiff line, or an inoperative bank.

If the reactive power and voltage values meet the predetermined criteria, then control branches to action boxes 234, 236 and 238. As illustrated in action box 234, the controller automatically determines the size of the capacitor bank from the readings obtained from the illustrated sequence. The capacitor bank size is equal to the average of the two $\Delta$VAR calculations. Thus, the controller adaptively and automatically determines the size of the capacitor bank.

The controller then determines the CLOSE set point, in accordance with action box 236, and determines the TRIP set point, in accordance with action box 238. The CLOSE set point is determined by multiplying the size of the capacitor bank by a selected value, e.g., two-thirds (⅔). Generally, employing a capacitor bank that is ⅔ the size of the value needed to reduce the peak load VARS to zero optimizes the power loss reduction in the line. Thus, installing the appropriate size capacitor bank on the line optimizes the electrical efficiency of the distribution system and reduces power losses by adding an appropriate level of leading reactive current to the system.

The TRIP set point is determined by the following formula:

$$\text{TRIP=CLOSE set point}-(\text{bank size} \times 1.25)$$

where a negative (−) sign indicates that the TRIP point is more leading than the CLOSE set point by the quantity (bank size×1.25). The controller ensures that the CLOSE and TRIP set points are within a selected range relative to each other by selecting the particular incremental value, e.g., 1.25, that is multiplied by the capacitor bank size. This incremental value termed set point bandwidth establishes the difference between the set points. Furthermore, the controller prevents premature switching of the capacitor bank by determining the appropriate set point bandwidth.

Figure 5B:
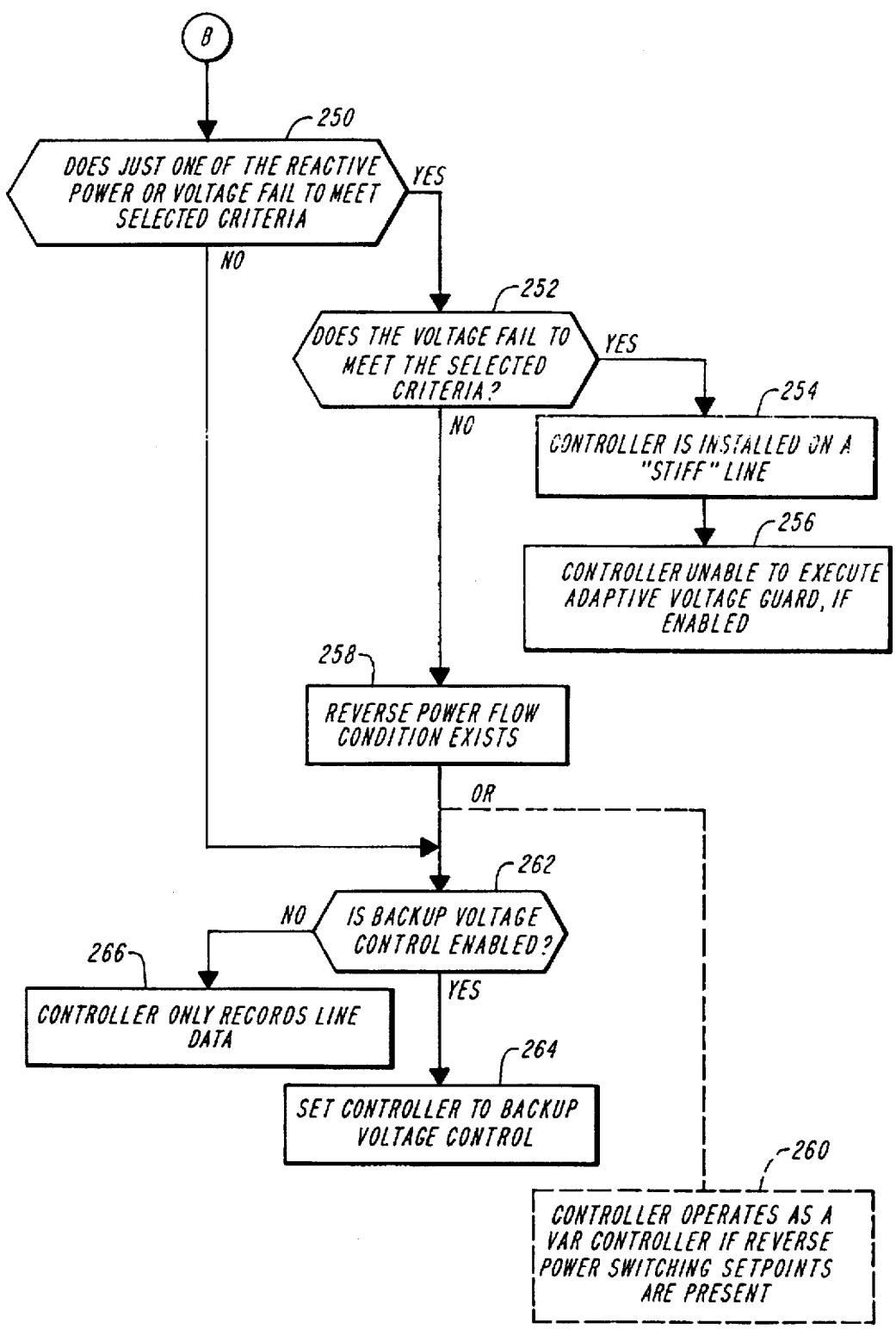
FIG. 5B is a continuation of the flow chart diagram of FIG. 5A detailing the preferred process in accordance with the present invention for adaptively and automatically establishing the operational set points of the power capacitor controller of FIG. 1.

Conversely, if the reactive power and voltage values fail to meet the predetermined criteria, then control branches to action box 240, where the controller determines the number of times the controller has executed the illustrated sequence. Decision box 242 determines whether the number of times the controller executed the sequence exceeds a predetermined value, e.g., four. If so, the controller waits a selected period of time, e.g., 6 hours, in accordance with action box 244, and then the controller re-executes the sequence starting at action box 202. When the number of times the controller executes the sequence exceeds the predetermined value, control branches to decision box 250 of FIG. 5B. FIG. 5B is a continuation of the flowchart of FIG. 5A, with the letter designation B illustrating that the sequences are a continuation of each other.

Decision box 250 determines whether one or both of the reactive power and line voltage readings established by the controller fail to meet the foregoing criteria. If both the voltage and reactive power readings fail to meet the predetermined criteria, then control branches to decision box 262. Failure to meet the selected criteria for both parameters indicates that either the capacitor bank is inoperative, or that there is a reverse power flow condition, which manifests itself as a minimal change in VARS, and the line is sufficiently stiff that there is a nominal rise in voltage, if any, when the capacitor bank is switched on and off the line. The controller is unable to distinguish these two conditions and thus switches to back-up voltage control, if enabled.

If one of the parameters passes the predetermined criteria, control branches to decision box 252 where the controller ascertains whether the voltage passed the criteria. If the voltage readings failed to meet the criteria, then control branches to action boxes 254 and 256. In accordance with these boxes, the controller determines that the line is relatively stiff, and that the controller is incapable of executing the adaptive voltage guard feature of the present invention, if enabled. The adaptive voltage guard feature of the invention is described in greater detail below.

When the controller determines that the voltage passes the selected criteria but that the reactive power fails to meet the criteria, control branches to action box 258 where the controller determines that a reverse power flow condition exists. The characteristics of a reverse power flow condition are that capacitor switching causes no change in reactive power but causes a change in the line voltage.

Referring again to FIG. 5B, the controller has the option of either operating as a VAR controller by establishing reverse power VAR switching points or operating as a voltage controller. Action box 260, illustrated in dashed lines since it represents a controller option, establishes the reverse power set points for reverse power VAR control. The controller employs the normal operating VAR set points to calculate the reverse power set points. Specifically, the controller determines the reverse power CLOSE set point by multiplying the normal operation CLOSE set point by negative 1. The reverse power TRIP set point (rp TRIP) is calculated using the following formula:

$$rp\ TRIP = (0.8 \times normal\ CLOSE + 0.2 \times normal\ TRIP) \times (-1)$$

Decision box 262 determines whether the back-up voltage feature of the present invention is enabled. If so, control branches to action box 264 and the controller operates as a voltage controller. Conversely, if the voltage control feature is disabled, control switches to action box 266 and the controller records selected line data.

A significant feature of the adaptive VAR control feature of this invention is that it allows the controller to establish adaptively and automatically the operational set points of the controller. The controller when executing the illustrated sequence eliminates the need for requiring field personnel to establish manually the operational set points, which relies upon the relative expertise of the personnel. Consequently, the adaptive power capacitor controller reduces costs associated with installation and maintenance of the power capacitor controller.

Figure 6:
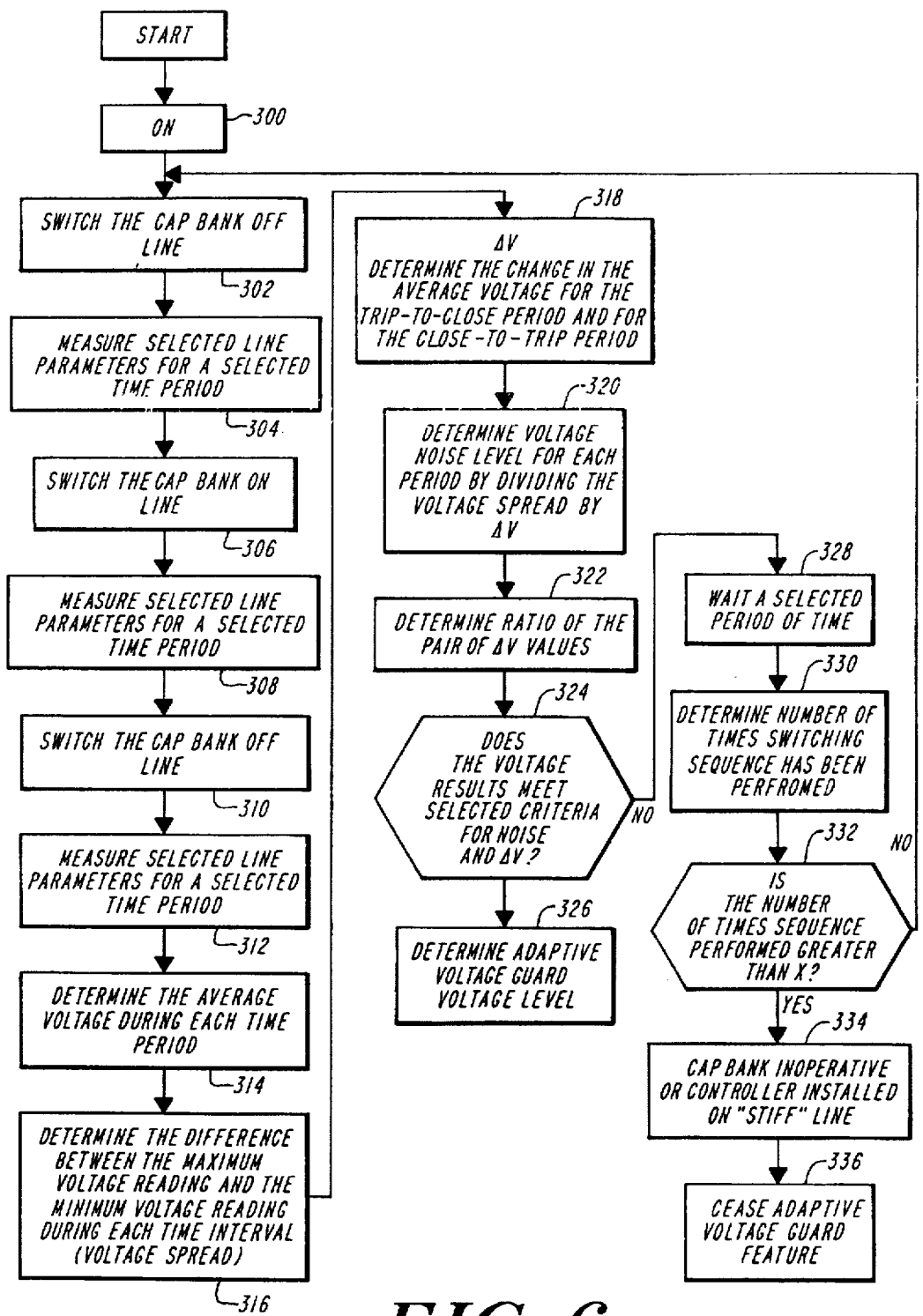
FIG. 6 is a flow chart diagram detailing the preferred process in accordance with the present invention for automatically establishing a selected line voltage guard level of the power capacitor controller of FIG. 1.

FIG. 6 shows an illustrated flow diagram of operations of the power capacitor controller for adaptively and automatically determining a voltage guard voltage level. The voltage guard is used to prevent connection or disconnection of the capacitor bank relative to the line if a pending switching operation would cause the line voltage to exceed a predetermined voltage range that is stored in memory. For example, the controller inhibits connection of the bank to the line if the sum of the measured line voltage and the voltage guard voltage level exceeds a predetermined voltage level. Similarly, the controller inhibits disconnection of the bank from the line if the difference between the line voltage and the voltage guard is less than a selected voltage level. Thus, the controller preserves the integrity of the line by inhibiting switching operations that would subject the line to undesirable undervoltage or overvoltage conditions. In the illustrated sequence, the voltage guard voltage level is preferably between about 0.3 Volt and about 15 Volts. The predetermined voltage range is preferably between about 90 Volts and about 145 Volts for 120 V line, and preferably between about 180 Volts and about 280 Volts for a 240 V line, and is preloaded in the controller's memory.

The controller determines the voltage guard voltage level by examining the voltage history of the line. The controller determines the line voltage history by examining the line voltage when the capacitor bank is switched on and off the line. According to one practice, the controller utilizes the line voltage history obtained from the sequence illustrated in FIG. 5A in relation to the adaptive VAR feature of the invention. If the adaptive VAR feature is disabled, the controller obtains the necessary voltage history of the line as described below.

With reference to FIG. 6, logical flow in the illustrated sequence begins at box 300 and proceeds to action box 302 where the controller switches the capacitor bank off line. Control then proceeds to action box 304 where the controller determines the line voltage during a selected time period, e.g., 30 seconds. The controller then switches the capacitor bank on line in accordance with action box 306. Again, the controller determines the voltage of the line during a selected period of time, e.g., thirty seconds, as shown in box 308. As illustrated in action boxes 310 and 312, the controller switches the capacitor bank off line, and then determines the line voltage during a set time period, e.g., thirty seconds.

As illustrated by action box 314, the controller determines the average voltage during each selected time period. The controller further determines the voltage spread, in accordance with action box 316, by determining the difference between the average maximum voltage and the average minimum voltage for each period. Action box 318 illustrates that the controller then determines the change in voltage (ΔV) of the line during each time period defined by the TRIP-to-CLOSE interval (action boxes 304 and 308) and by the CLOSE-to-TRIP interval (action boxes 308 and 312).

In accordance with action box 320, the controller arithmetically divides the value associated with the voltage spread by the value associated with the ΔV reading to determine the noise due to voltage changes in the line during each time period, e.g., during each 30 second time interval. The controller then determines the ratio of the two ΔV readings, as shown in box 322 to ensure that the line is operating under stable loading conditions.

Decision box 324 illustrates that the controller determines whether the foregoing voltage readings meet selected criteria. For example, with regard to the line voltage, the controller establishes whether the readings obtained by the illustrated sequence fail to meet selected criteria by determining whether 1) either ΔV reading is within a selected voltage range including sign, such as between 0 Volts and 17 Volts; or 2) the ΔV ratio is outside of a predetermined range of values, such as between 0.8 and 1.2; or 3) the calculated voltage noise is greater than a specified value, e.g., 0.2.

If the reactive power and voltage values meet the predetermined criteria then control branches to action box 326. As illustrated in this box, the controller automatically determines the voltage guard voltage level from the readings obtained from the illustrated sequence. According to one practice, the voltage guard voltage value is equal to ΔV times a selected bandwidth size (ΔV ×Bω) that is compatible with existing utility companies. The ΔV value is preferably equal to the average of the two unsigned ΔV calculations. The selected bandwidth value is preferably between about 1.1 and about 1.5, and most preferably is 1.25.

When the controller determines that the measured line voltage fails to meet the foregoing criteria, control branches to action box 328 where the controller remains idle for a selected period of time, e.g., 6 hours. Subsequently, as illustrated in action box 330, the controller then determines the number of times it has performed the illustrated sequence.

Decision box 332 illustrates a determination by the controller whether the controller has performed the illustrated sequence more than a selected number of times, e.g., four. If the controller has performed the sequence fewer than four times, then control branches back to action box 302. Conversely, if the controller has performed the sequence greater than the selected number of times, then control branches to action box 334 where the controller determines that the capacitor bank is inoperative or that the line is relatively stiff. In accordance with action box 336, the controller terminates the adaptive guard feature of the present invention.

A significant feature of the adaptive voltage guard feature of the present invention is that the controller adaptively and automatically establishes a voltage guard voltage level to help determine whether a pending bank switching operation, e.g., either a CLOSE or TRIP switching operation, would be deleterious to the line. This adaptive feature, when enabled, can be a stand alone feature of the controller or can be used in conjunction with one or more of the other features of the controller, such as the adaptive VAR feature of the invention.

FIGS. 5B and 6 further illustrate that the controller can automatically determine when the capacitor bank is inoperative. With specific reference to boxes 250 and 262 of FIG. 5B, and to box 334 of FIG. 6, the controller determines that the capacitor bank is inoperative when there is a minimal change, if any, in the reactive power and voltage of the line during bank switching operations. Consequently, the controller can either remain in an idle mode, e.g., does not perform any switching operations, or can default to back-up voltage control. The particular mode of operation is determined by the software program developed in accordance with the needs of the end-user.

Figure 7:
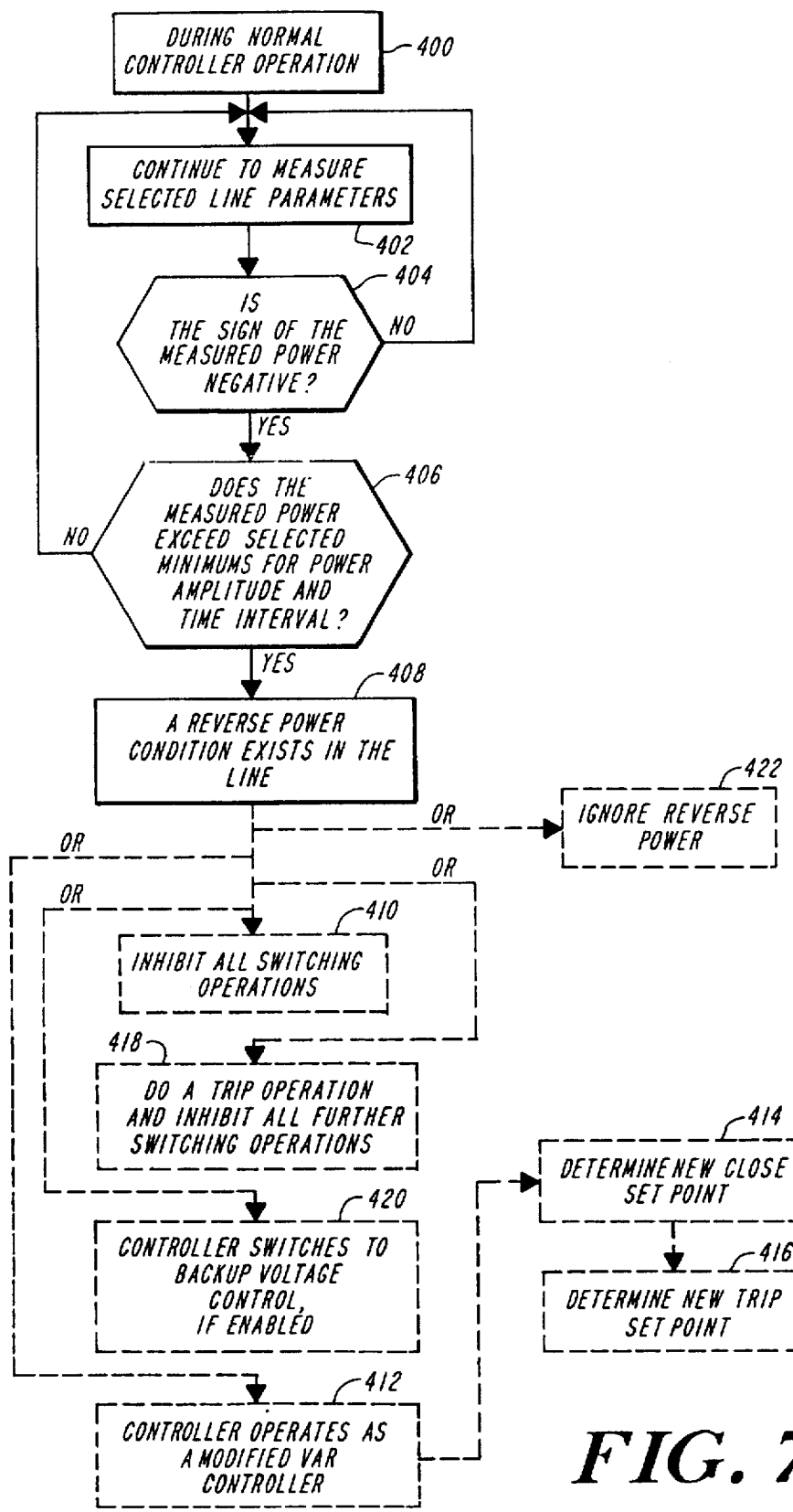
FIG. 7 is a flow chart diagram detailing the preferred process in accordance with the present invention for automatically determining when a reverse power condition exists in the distribution system of FIG. 1.

FIG. 7 shows an illustrated flow diagram of operations of the power capacitor controller for automatically determining when a reverse power condition exists in the line. According to one practice, once the controller determines the proper phase angle offset value and the controller operational set points, either by the foregoing adaptive features or by program set-up, the controller then proceeds to monitor the line for a reverse power condition.

Logical flow in the illustrated sequence begins at action box 400 where the controller monitors the line for a reverse power condition during normal controller operation. The sensors in electrical communication with the controller monitor the line by constantly measuring selected electrical parameters thereof, and the controller determines selected electrical line parameters, such as the real and reactive power of the line, in accordance with action box 402. Decision box 404 illustrates that the controller determines whether the sign of the real power is negative. If a negative power flow exists, control branches to decision box 406. Conversely, if the sign of the real power is other than negative, control branches back to action box 402.

Decision box 406 determines whether the measured power exceeds a selected minimum power value for a selected period of time. If so, then in accordance with action box 408, the controller dertermines that a reverse power condition exists in the line. When the measured power value is less than the selected minimum value, then control branches back to action box 402. During a reverse power line condition, the controller can perform one of several operations, as illustrated by the dashed action boxes 410 through 422. Any one of these particular controller operations can be selected by program set-up. Thus, the software program resident in the controller memory module determines the particular mode of operation during reverse power.

As illustrated by action box 410 and according to one practice of the invention, the controller inhibits all bank switching operations. Specifically, the controller prevents the capacitor bank from being cyclically connected to and disconnected from the line. This mode of operation reduces wear on the electrical and mechanical components of the system and thus prolongs the useful life of the parts.

According to another practice, the controller operates as a modified VAR controller, as illustrated by the dashed action boxes 412–416. The controller determines new operational set points, e.g., CLOSE and TRIP set points, from the previous normal condition set points. The method of determining the new operational set points was set forth above in relation to FIG. 5B, and need not be repeated here.

According to still another practice, in accordance with action box 418, the controller disconnects the capacitor bank from the line and inhibits all further capacitor bank switching operations. According to another practice in accordance with the dashed action box 420, the controller switches to back-up voltage control and thus operates as a voltage controller. Finally, the controller can simply ignore the reverse power condition in the line, as illustrated by the dashed action box 422.

A significant feature of the reverse power feature of the invention is that the controller automatically determine when a reverse power line condition exists, and automatically operates in a preselected manner.

Figure 8:
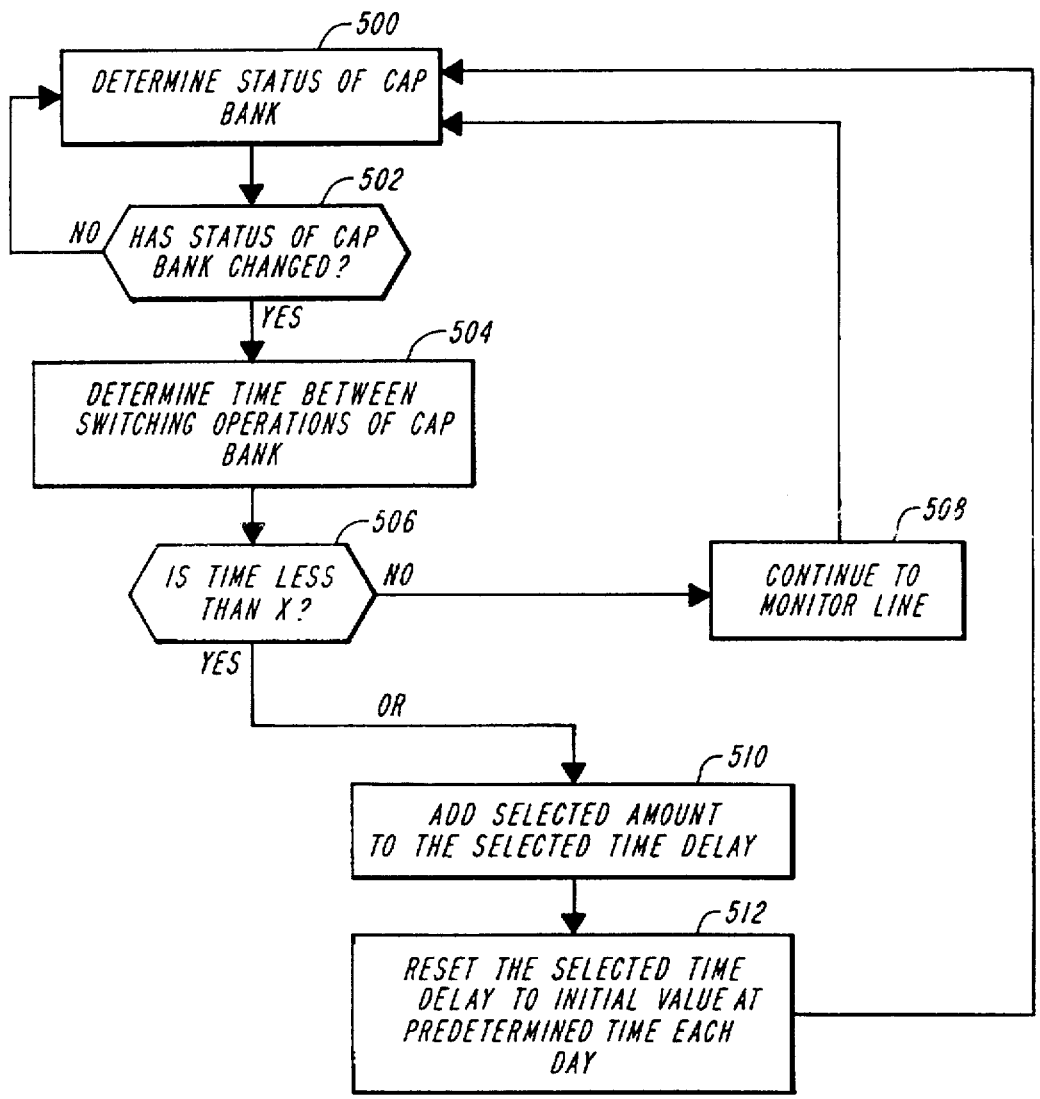
FIG. 8 is a flow chart diagram detailing the preferred process in accordance with the present invention for automatically determining when the "pumping" of multiple capacitor banks connected to the distribution system of FIG. 1 induces a switching operation in one or more of the banks.

FIG. 8 shows an illustrated flow diagram of operations of the power capacitor controller of the invention for automatically determining when a previous or pending capacitor bank switching operation is due to the "pumping" operation of multiple banks on the line. Capacitor bank "pumping" is a line situation where the addition or subtraction of banks relative to the line induces one or more of the remaining capacitor banks to switch on or off the line in a cyclical manner. For example, the controller can introduce leading reactive current to the line to offset the lagging reactive current of the load by connecting a capacitor bank to the line. The additional leading reactive current typically affects that portion of the line between the capacitor bank and the power source, i.e., upstream of the controller. Consequently, any additional controller located upstream of this controller is exposed to an additional level of leading reactive current. According to one practice, if the second controller upstream of this bank has previously performed a CLOSE operation, i.e., connected the capacitor bank to the line, the additional leading reactive current may induce the second controller to perform a TRIP operation, i.e., disconnect the bank from the line. The TRIP operation performed by the second controller reduces the upstream leading reactive current. If a third controller located upstream of the second controller had previously performed a TRIP operation, the reduction in leading reactive current may induce the third controller to perform a CLOSE operation. Hence, this cyclical wave-like operation of the controllers along the line exposes the switching components to unnecessary stress and strain associated with repeated switching operations, and introduces unwanted electrical perturbations to the line.

With reference to the flow diagram of FIG. 8, logical flow begins at action box 500 where the controller determines the status of the capacitor bank relative to the line, i.e., either connected thereto or disconnected therefrom. Control proceeds to decision box 502 where the controller determines whether the status of the capacitor bank has changed. If the status remains the same, control branches to action box 500 of the illustrated sequence. Conversely, if the bank status has changed, control branches to action box 504 where the controller determines the time between switching operations of the capacitor bank. According to one practice, the controller determines the time between successive CLOSE and TRIP operations.

As illustrated in decision box 506, the controller then determines if the time between the CLOSE and TRIP operations is less than a predetermined time, e.g., about two hours. If the time between the switching operation exceeds the predetermined time, logical flow branches to action box 508 and then back to action box 500. In accordance with action box 508, the controller continues to monitor the line. According to one practice, when the time between successive switching operations exceeds the predetermined time, the controller assumes that the switching operations are induced by normal operating phenomena, e.g., excessive inductive load connected to the line, and not from the pumping action of multiple banks on the line.

When the time between the CLOSE and TRIP operations is less than the predetermined time, the logical flow of the illustrated sequence branches to action boxes 510 and 512. As illustrated in box 510, the controller adds a selected amount of time, e.g., about two minutes, to the predetermined time. This time delay value, when added to the base time value, increases the minimum time that must elapse between switching operations before the controller allows the next switching operation to occur. The sequence will continue to add the selected time increment to the predetermined time until the sum of the two time increments is equal to about eight hours. In accordance with action box 512, the controller resets the time delay value to the initial set point delay at a selected time each day. According to one practice, the controller resets the time delay value each day at midnight. Logical flow then branches back to action box 500. Thus, when the time between the bank switching operations is less than the predetermined time, the controller assumes that the switching operations are induced by the pumping action of multiple banks, and thus adds a selected switching inhibit time to the stored time value to prevent rapid switching operations.

According to another practice of the invention, when the time between successive switching operations, e.g., between a CLOSE and TRIP operation, is less than the predetermined time, the controller automatically adjusts the TRIP set point a selected percentage, thus preventing the immediate disconnection of the bank from the line. Correspondingly, the controller adjusts the CLOSE set point, which is proportionally related to the TRIP set point as previously described in relation to FIGS. 4A and 4B. The controller preferably adjusts the TRIP set point between about 10% and about 35%, and most preferably about 25%.

A significant feature of the present invention is that the multiple bank switching feature prevents unwanted switching operations to occur. The reduction in the number of unwanted switching operations helps extend the useful life of the switching components while reducing the amount of unwanted electrical perturbations that the bank switching operations introduce to the line.

In operation, the power capacitor controller of the invention adaptively and automatically determines and records the history of selected electrical line parameters in accordance with a selected program loaded in the controller's memory. From this recorded parameter history, the controller adaptively and automatically determines the total phase angle offset value, the size of the capacitor bank, and the VAR operational set points of the controller. The total phase angle offset value compensates for the difference in line when the current and voltage sensors are connected to different lines of the multi-phase distribution system. The operational set points determine when the controller connects the bank to and disconnects the bank from the electrical line. Additionally, the controller determines the adaptive voltage guard voltage value from the recorded voltage history of the line. The phase angle compensation feature and the operational set point features of the invention can be simultaneously enabled. However, if one or both of the features is disabled, the operational set points and the angle compensation value can be entered by program set-up.

After the controller records the parameter history of the distribution system, the controller continues to monitor the electrical parameters to determine the appropriate time to connect the capacitor bank to the line. Typically, the load reactive power of the line increases during the day due to the connection of large inductive loads thereto. The inductive loads add lagging reactive current to the line, which results in a loss of power due to unwanted heating of the line conductors. To reduce this power loss, the controller activates the switching element to connect the capacitor bank to the line when the reactive power of the line exceeds the CLOSE operational set point. When coupled to the line, the capacitor bank adds leading reactive power thereto to offset the lagging reactive power of the load, and thus reduces the power loss in the line while increasing the electrical efficiency of the system.

During the course of the day, the amount of leading reactive current in the line is typically decreased by the removal of inductive loads from the line. Consequently, the leading reactive current added to the line by the capacitor bank drives the line current in the leading direction.

When the line current exceeds the TRIP set point, the controller disconnects the bank from the line to decrease the leading reactive current of the line. Consequently, the controller reduces power loss in the line created as a result of excess leading reactive current while increasing the electrical efficiency of the system.

The controller further monitors the line for reverse power conditions. According to one practice, a power source typically located upstream of the controller supplies power to the controller and to the electrical load. If an electrical fault develops in the line between the controller and the load, the utility company may disconnect the first power source from the line and supplies power thereto from another power source located downstream of the controller. Consequently, the power flow in the line is reversed. The controller automatically determines that the reverse power condition exists by recording a negative change in the real power of the line. The controller then operates in one of several ways as set forth fully in FIG. 7. According to one preferred practice, the controller operates as a modified VAR controller and establishes new VAR operational set points based on the previous normal condition set points.

The controller is further capable of automatically and adaptively compensating for a reverse current line condition caused by the incorrect, i.e., backwards, installation of the current sensor on the line. The controller determines that the current in the line is reversed by recording a negative change in the current, and hence real power, of the line. In accordance with the sequence set forth in the computer program, the controller automatically compensates for a reverse current line condition by adding 180 degrees to the phase angle offset value. The determination of the reverse current condition and the computation of the selected phase angle offset value is set forth above in relation to FIGS. 4A and 4B.

The power capacitor controller of the invention further operates as a voltage controller under selected conditions. According to one practice, the controller can be configured by program set-up to perform a bank switching operation in response to the measured line voltage. Thus, the controller disconnects the bank from the line when the line voltage exceeds a stored high voltage limit, and connects the bank to the line when the line voltage falls below a stored lower voltage limit. Additionally, inhibiting connection of the bank to the line during overvoltage conditions preserves the integrity of the line by avoiding unwanted electrical perturbations and excessive operation of the switching equipment. The power capacitor controller may function as a voltage controller when a reverse power line condition exists, and when the controller is unable to determine accurately the total phase angle offset value and the VAR operational set points of the line because of abnormal line or equipment conditions.

The adaptive voltage guard feature of the invention also helps prevent overvoltage and undervoltage conditions from developing on the line. The voltage guard feature can be enabled simultaneously with the phase angle compensation feature and with the operational set point feature of the present invention. According to one practice, the controller inhibits a pending switching operation if the arithmetic combination of the guard voltage and the measured line voltage is outside of a selected voltage range determined by the computer program. For example, the controller inhibits connection of the bank to the line if the arithmetic sum of the guard voltage and the line voltage exceeds a selected amount. Likewise, the controller inhibits disconnection of the bank from the line if the arithmetic difference between the measured line voltage and the guard voltage is below a selected voltage level. Thus, the controller functions as a modified voltage controller during abnormal line conditions.

In further operation of the invention, the controller is capable of preventing a switching operation when a previous or pending bank switching operation is due to the cyclical operation of multiple banks on the line. First, the controller determines the time between bank switching operations during normal operating conditions. When a pending bank switching operation, e.g., a TRIP operation, would disconnect the bank from the line in a time less than a predetermined time value, the controller assumes that the switching is caused by the switching of multiple banks. Consequently, the controller inhibits switching of the bank to the line and adds a selected time delay value to the predetermined initial time value. The controller then proceeds to effectuate the pending switching operation at the end of the extended time interval if the line conditions that exist warrant switching of the bank at that time.

It will thus be seen that the invention efficiently attains the objects set forth above, among those made apparent from the preceding description. Since certain changes may be made in the above constructions without departing from the spirit and scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and secured by Letters Patent is:

1. An adaptive power capacitor controller system for adjusting the reactive power of an electrical line by selectively applying a capacitor bank to the line, said controller system comprising sensor means for sensing at least a reactive current condition of the line, switching means for coupling the capacitor bank to the line, said switching means establishing a first line state when the capacitor bank is connected to the line and establishing a second line state when the capacitor bank is disconnected from the line, and control means associated with said switching means and with said sensor means for selectively operating said switching means to connect and to disconnect the bank relative to the line, said control means including means for actuating said switching means for attaining a selected succession of said first and second line states, means for determining a change in said reactive current of the line in response to at least said sensed reactive current during said selected succession of said first and second line states, first threshold determination means for automatically determining a first threshold value of at least said sensed line condition at which said control means operates said switching means to establish said first line state in response to said change in reactive current, and second threshold determination means for automatically determining a second threshold value of at least said sensed line condition at which said control means operates said switching means to establish said second line condition in response to said change in reactive current.

2. An adaptive power capacitor controller system according to claim 1, wherein said first threshold determination means includes means for determining said first threshold when said control means connects the capacitor bank to the line, and said second determination means includes means for determining said second threshold when said control means disconnects the capacitor bank from the line.

3. An adaptive power capacitor controller system for adjusting the reactive power of an electrical line by selectively applying a capacitor bank to the line, said controller system comprising a sensor for sensing at least one of a reactive current condition of the line and a voltage condition of the line, a switching element for coupling the capacitor bank to the line, said switching element establishing a first line state when the capacitor bank is connected to the line, and establishing a second line state when the capacitor bank is disconnected from the line, and control means associated with said switching element and with said sensor for selectively operating said switching element to connect the bank relative to the line, said control means including means for actuating said switching means for a selected succession of said first and second line states, means for determining a change in said reactive current of the line in response to at least one of said sensed reactive current and said sensed voltage between said first and second states during said selected succession, first threshold determination means for automatically determining a first threshold of at least one sensed line condition at which said control means operates said switching means to establish said first line condition in response to said change in reactive current, and second threshold determination means for automatically determining a second threshold of at least one sensed line condition at which said control means operates said switching means to establish said second line condition in response to said change in reactive current.

4. An adaptive power capacitor controller of the type arranged for adjusting the reactive power of an AC electrical line carrying a selected voltage by selectively applying a capacitor bank to the line with a switching element in response to a selected reactive current condition in the line, said capacitor controller comprising programmed control means for automatically actuating the switching element for coupling the capacitor bank to the line to adjust said reactive power thereof, said control means including memory means for storing a program for operating the switching element to connect and alternatively to disconnect the capacitor bank relative to the line according to a predetermined sequence to determine at least said reactive current of the line during said sequence, and parameter selection means coupled to said memory means for automatically determining a first set point corresponding to a first reactive condition at which said control means operates the switching element to connect the capacitor bank to the line and for automatically determining a second set point corresponding to a second reactive condition at which said control means operates the switching element to disconnect the capacitor bank from the line.

5. An adaptive power capacitor controller according to claim 4, wherein the capacitor bank has a selected size, and wherein said control means includes means for determining the size of the capacitor bank in response to at least said reactive current in the line.

6. An adaptive power capacitor controller of the type for adjusting the reactive power of at least one electrical line in a set of multi-phase power lines by selectively applying a capacitor bank to the line, the electrical lines carrying reactive current having a phase angle relative to a particular line voltage, said capacitor controller comprising control means coupled to at least one of said lines for coupling the capacitor bank to the line to adjust said reactive power thereof, said control means including phase determination means for automatically determining the phase of said reactive current in said line relative to the voltage in a further line.

7. An adaptive power capacitor controller according to claim 6, wherein said control means further comprises compensation means for automatically compensating for said phase of said reactive current in said line to attain a selected phase relative to the voltage on a further line.

8. An adaptive power capacitor controller according to claim 6, wherein the electrical line carries real power and reactive power, said phase determination means further including power determination means for determining at least one of said reactive power of the electrical line and the magnitude of said real power of the electrical line, memory means for storing selected phase compensation values associated with at least one of said real power and with said reactive power determined by said power determination means, and means coupled to said memory means for comparing said reactive power and said real power with said stored phase compensation values to determine the appropriate phase compensation value indicative of said phase angle of said reactive current relative to said line voltage.

9. An adaptive power capacitor controller according to claim 8, wherein said control means further includes compensation means for automatically compensating for said phase of said reactive current determined by said phase determination means by said selected phase compensation value corresponding to at least one said real power and said reactive power.

10. An adaptive power capacitor controller of the type for adjusting the reactive power of an AC electrical line, wherein the electrical line carries real power and reactive current having a phase angle relative to the line voltage, by selectively applying a capacitor bank to the line with a switching element, said capacitor controller comprising programmed control means for automatically actuating the switching element for coupling the capacitor bank selectively to the line to adjust said reactive power thereof, said control means including memory means for storing a program for operating the switching element to connect the capacitor bank to the line according to a predetermined sequence to determine changes in at least said reactive current of the line and said real power of the line, first determination means for automatically determining a change in said reactive current of the line during said predetermined sequence, said first determination means including means for generating a first value corresponding to a change in said reactive current, second determination means for automatically determining said change in said power of the line during said predetermined sequence, said second determination means including means for generating a second value corresponding to a negative change in said power, and adjustment means responsive to said first and second values for automatically compensating for said phase angle of said reactive current relative to the line voltage by a selected phase compensation value stored in said memory means and which value corresponds to at least one of said first and second values, whereby said first and second values indicate a reverse current condition in the line.

11. An adaptive power capacitor controller of claim 10, wherein said selected phase compensation value is about 180 degrees.

12. An adaptive power capacitor controller of the type for adjusting the reactive power of an AC electrical line, wherein the electrical line carries reactive current and a selected voltage, by selectively applying a capacitor bank to the line with a switching element, the switching element disconnecting the capacitor bank from the line when the line voltage exceeds a first selected voltage level, and connecting the bank to the line when the line voltage falls below a second selected voltage level, said capacitor controller comprising programmed control means for automatically actuating the switching element for coupling the capacitor bank selectively to the line to adjust said reactive power thereof, said control means including memory means for storing a program for operating the switching element to connect the capacitor bank relative to the line according to a predetermined sequence to determine changes in said reactive current of the line and said voltage of the line, first determination means for automatically determining said change in said reactive current of the line during said predetermined sequence, said first determination means including means for generating a first value when said change in said reactive current is about equal to zero, second determination means for automatically determining said change in said voltage of the line during said predetermined sequence, said second determination means including means for generating a second value corresponding to a change in said voltage, and predetermined parameter selection means, responsive to said first and second values and coupled to said memory means, for automatically establishing a first predetermined set point stored in said memory means as said first voltage level, and for automatically establishing a second predetermined set point stored in said memory means as said second voltage level, whereby said first and second values indicate a reverse power condition in the line.

13. An adaptive power capacitor controller of the type arranged for adjusting the reactive power of an AC electrical line carrying a selected voltage by selectively applying a capacitor bank to the line with a switching element, the switching element connecting the capacitor bank to the line in response to a selected reactive current condition in the line, said capacitor controller comprising programmed control means for automatically actuating the switching element for coupling the capacitor bank selectively to the line to adjust said reactive power thereof, said control means including memory means for storing a program therein, said stored program being adapted to operate the switching element to connect the capacitor bank relative to the line according to a predetermined sequence, first determination means for automatically determining at least said reactive current of the line during said predetermined sequence, parameter selection means coupled to said memory means and said first determination means for automatically determining a first set point corresponding to a first reactive current condition at which said control means operates the switching element to connect the capacitor bank to the line, and for automatically determining a second set point corresponding to a second reactive current condition at which said control means operates the switching element to disconnect the bank from the line, and adjustment means for automatically adjusting at least one of said set points when said reactive current condition in the line attains one of said reactive current conditions within a selected time of a previous reactive current condition, said previous reactive current condition corresponding to one of said first and second reactive current conditions.

14. An adaptive power capacitor controller according to claim 13, wherein said adjustment means automatically adjusts at least one of said set points when said control means disconnects the bank from the line within a selected time after said control means connects the capacitor bank to the line.

15. An adaptive power capacitor controller according to claim 13, wherein at least one of said set points is said second set point, and wherein said control means further includes means for inhibiting connection of the capacitor bank relative to the line when the line attains said first and second reactive current conditions within a preselected time, said preselected time being stored in said memory means.

16. An adaptive power capacitor controller according to claim 13, wherein said adjustment means is adapted to increase said second set point a selected amount between about 10% and about 35%.

17. An adaptive power capacitor controller of the type arranged for adjusting the reactive power of an AC electrical line carrying a selected voltage by selectively applying a capacitor bank to the line with a switching element, the switching element disconnecting the capacitor bank from the line when the line voltage exceeds a first selected voltage level, and connecting the bank to the line when the line voltage falls below a second selected voltage level, said capacitor controller comprising programmed control means for automatically actuating the switching element for coupling the capacitor bank selectively to the line to adjust said reactive power thereof, said control means including memory means for storing a program for operating the switching element to connect the capacitor bank to the line according to a predetermined sequence to determine at least a change in line voltage due to connection of the capacitor bank, said memory means including means for storing a first predetermined set point corresponding to said first voltage level and a second predetermined set point corresponding to said second voltage level, said first and second set points defining a selected voltage range, voltage selection means for automatically establishing a selected voltage level in response to at least said change in line voltage according to said predetermined sequence resident in said memory means, and inhibit means for automatically inhibiting said control means from operating the switching element to connect the bank relative to the line when a selected combination of said line voltage and said selected voltage level is outside of said selected voltage range.

18. An adaptive capacitor controller according to claim 17, wherein said inhibit means includes first prevention means for inhibiting connection of the capacitor bank to the line when said first selected voltage level is smaller than the arithmetic sum of the selected voltage level and the line voltage, and second prevention means for inhibiting disconnection of the capacitor bank from the line when said second selected voltage level is greater than the arithmetic difference between the line voltage and the selected voltage level.

19. An adaptive power capacitor controller according to claim 17, wherein said selected voltage range is between about 114 volts and about 126 volts.

20. A power capacitor controller of the type arranged for adjusting the reactive power of an AC electrical line carrying a selected voltage by selectively applying a capacitor bank to the line with a switching element, the switching element disconnecting the capacitor bank from the line when the line voltage exceeds a first selected voltage level, and connecting the bank to the line when the line voltage falls below a second selected voltage level, said capacitor controller comprising control means for automatically coupling the capacitor bank to the line to adjust said reactive power thereof, said control means including memory means for storing a first predetermined set point corresponding to said first voltage level and a second predetermined set point corresponding to said second voltage level, and means for switching the capacitor bank relative to the line when the line voltage attains one of said first and second set points.

21. A power capacitor controller system for adjusting the reactive power of an AC electrical line carrying reactive current and voltage by selectively applying reactive capacitance thereto from a capacitor bank, said controller system comprising current sensing means for sensing a reactive current line condition in the electrical line and for generating a current output signal indicative of sensed reactive current, voltage sensing means for sensing a voltage line condition in the electrical line and for generating a voltage output signal indicative of sensed voltage, switch means in circuit with said current sensing means and said voltage sensing means for selectively connecting the capacitor bank relative to the electrical line, and programmed control means in electrical communication with said switch means for automatically actuating said switch means to couple the capacitor bank selectively with the electrical line to adjust the reactive power thereof, said control means including memory means for storing at least one of said line conditions, and automatic parameter selection means coupled to said memory means for automatically establishing a first parameter determining connection of the capacitor bank to the electrical line and for automatically establishing a second parameter determining disconnection of the capacitor bank from the line in response to at least said reactive current output signal, said first and second parameters being established according to a programmed sequence resident in said memory means, whereby said controller system is adaptive and operates with programmed intelligence.

22. An adaptive power capacitor controller system according to claim 21, wherein said control means further includes measurement means for measuring a change in said reactive current of the electrical line over a selected period in response to at least said reactive current output signal, and means for generating a value indicative of said reactive power in response to said reactive current output signal, and determination means responsive to said reactive power value for automatically determining the size of the capacitor bank.

23. An adaptive power capacitor controller system according to claim 21, further comprising signal conditioning means coupled to at least said current sensing means for removing electrical noise from said current output signal.

24. An adaptive power capacitor controller system according to claim 21, further comprising signal conditioning means coupled to at least said voltage sensing means for amplifying said voltage output signal.

25. An adaptive power capacitor controller system according to claim 21, further comprising selection means coupled to said control means and to at least one of said current sensing means and said voltage sensing means for selectively inputting to said control means at least one of said current output signal and said voltage output signal.

26. An adaptive power capacitor controller system according to claim 21, further comprising converter means for converting at least one of said current output signal and said voltage output signal to an output digital signal, said converter means including means for transmitting said output digital signal to said control means.

27. An adaptive power capacitor controller system according to claim 21, for use with at least one electrical line of a set of multi-phase power lines having a selected phase angle relative to the sensed line voltage, said control means further comprising automatic phase measuring means for automatically determining the phase angle of said reactive current relative to the sensed line voltage.

28. An adaptive power capacitor controller system according to claim 27, wherein said control means further comprises compensation means for automatically compensating for the phase angle of the reactive current in said electric line to attain a selected phase relative to said sensed line voltage.

29. An adaptive power capacitor controller system according to claim 27, wherein the electrical line carries real power and reactive power, and wherein said automatic phase measuring means includes power measurement means for determining said reactive power of the electrical line and for determining said real power of the electrical line in response to at least one of said current and voltage output signals, said power measurement means generating a first value indicative of said reactive power and a second value indicative of said real power.

said memory means further including means for storing one of said first and second values, each said value having associated therewith one or more selected phase angle compensation values stored in said memory means and corresponding to an amount by which said control means compensates for said phase angle of said current relative to said voltage, and means for determining the appropriate phase angle compensation value in response to said first and second values corresponding to said measured reactive power and said measured real power, respectively, whereby said control means automatically compensates for the phase angle of said reactive current by said appropriate phase angle value.

30. An adaptive power capacitor controller system according to claim 21, wherein said program is adapted to operate said switch means to connect the capacitor bank relative to the line according to said programmed sequence to determine changes in said reactive current of the line and said voltage of the line, said reactive current having a selected phase angle relative to said line voltage, and wherein said programmed control means further includes first determination means responsive to said reactive current output signal for automatically determining said change in said reactive current of the line during said programmed sequence, said first determination means including means for generating a first value corresponding to said change in said reactive current, second determination means responsive to said voltage output signal for automatically determining said change in said voltage of the line during said programmed sequence, said second determination means including means for generating a second value corresponding to a negative change in said voltage, comparison means for comparing one of said first and second values with at least one of a predetermined voltage value stored in said memory means and a predetermined reactive current value stored in said memory means, each said one predetermined value having a selected phase angle compensation value associated therewith, and adjustment means for automatically adjusting said phase angle of said reactive current by said selected phase angle compensation stored in said memory means and associated with said one selected value, whereby said first and second values indicate a reverse current condition in the line.

31. An adaptive power capacitor controller system according to claim 30, wherein said selected compensation phase angle value is about 180 degrees.

32. An adaptive power capacitor controller system according to claim 21, wherein said program is adapted to operate said switch means capacitor to connected bank capacitor bank relative to the line according to said programmed sequence to determine changes in said voltage and said reactive current of the line, and wherein said control means further comprises first determination means responsive to said current output signal for automatically determining said change in said reactive current of the line during said programmed sequence, said first determination means including means for generating a first value when said change in said reactive current is about equal to zero, and second determination means responsive to said voltage output signal for automatically determining said change in said voltage of the line during said programmed sequence, said second determination means including means for generating a second value corresponding to said change in said voltage, whereby said first and second values indicate a reverse power condition in the line.

33. An adaptive power capacitor controller system according to claim 32, wherein said control means further comprises inhibit means, coupled to said memory means and responsive to said first and second values, for inhibiting switching of the bank relative to the line in response to said reactive current signal, and voltage switching means, responsive to at least one of said first and second values and coupled to said memory means, for establishing a first predetermined voltage switching level corresponding to said first parameter and a second predetermined voltage switching level corresponding to said second parameter, said first and second voltage switching levels being stored in said memory means, said first switching level determining connection of the capacitor bank to the line when said line voltage falls below said first level, and said second switching level determining disconnection of the bank from the line when the said line voltage exceeds said second voltage level.

34. An adaptive power capacitor controller system according to claim 21, wherein said program is adapted to operate said switch means to connect the capacitor bank relative to the line according to said programmed sequence to determine at least said change in said reactive current of the line, and wherein said control means further comprises determination means for automatically determining said change in said reactive power of the line in response to one of said current output signal and said voltage output signal during said programmed sequence, said automatic parameter selection means determining said first and second parameters in response to said change in reactive current, time determination means for determining a first time interval between successive switching operations of said switch means, comparison means for comparing said first selected time interval with a predetermined time interval stored in said memory means, and connection inhibit means for inhibiting connection of the capacitor bank relative to the line when said first time interval is less than said predetermined time interval.

35. An adaptive power capacitor controller according to claim 34, further comprising adjustment means for adjusting said time interval between successive switching operations by adding a selected switching inhibit time amount to one of said predetermined time interval and said first time interval to increase the time interval between successive switching operations.

36. An adaptive power capacitor controller system according to claim 21, wherein said program is adapted to operate said switch means to connect the capacitor bank to the line according to said programmed sequence to determine a change in line voltage due to connection of the capacitor bank, said control means further comprising voltage selection means for automatically establishing a selected voltage value in response to at least said change in line voltage determined according to said programmed sequence, and inhibit means for automatically inhibiting said control means from operating said switch means when a combination of said line voltage and said selected voltage value is outside of a predetermined voltage range stored in said memory means.

37. An adaptive capacitor controller system according to claim 36, wherein said first parameter corresponds to a first predetermined voltage value stored in said memory means, and said second parameter corresponds to a second predetermined voltage value stored in said memory means, said inhibit means further comprising first prevention means for inhibiting connection of the capacitor bank to the line when said first predetermined voltage value is generally less than the arithmetic sum of the voltage guard voltage value and the line voltage, and second prevention means for inhibiting disconnection of the capacitor bank from the line when said second predetermined voltage value is generally greater than the arithmetic difference between the line voltage and the voltage guard voltage value.

38. An adaptive capacitor controller system according to claim 36, wherein said voltage range defined by said first selected voltage value and said second selected voltage value is between about 90 volts and about 140 volts for a 120 volt line, and between about 180 volts and about 280 volts for a 240 volt line.

39. An adaptive power capacitor controller system according to claim 36, wherein said selected voltage level is in the range of about 0.1 volts and about 10 volts.

40. An adaptive power capacitor controller system for adjusting the reactive power of an AC electrical line carrying reactive current and voltage by selectively applying reactive capacitance thereto from a capacitor bank, said controller system comprising current sensing means for sensing a reactive current condition in the line, voltage sensing means for sensing a voltage condition in the line, switch means in circuit with said current sensing means and said voltage sensing means for selectively connecting and disconnecting the capacitor bank relative to the electrical line, and programmed control means in circuit with said switch means for automatically actuating said switch means to couple the capacitor bank selectively relative to the electrical line to adjust the reactive power thereof, said control means including memory means for storing at least one of said line conditions and for storing a program sequence that operates said switch means in a selected manner to connect or disconnect the capacitor bank relative to the line, and automatic parameter selection means coupled to said memory means for automatically establishing a first selected voltage level that determines the connection of the capacitor bank to the electrical line in response to one of said stored line conditions according to said program sequence.

41. An adaptive power capacitor controller system of the type arranged for adjusting the reactive power of a set of multi-phase electrical lines by selectively applying a capacitor bank thereto, the electrical lines carrying reactive current having a selected phase angle relative to the voltage of any of the electrical lines, said controller system comprising current sensing means for sensing a reactive current condition in a selected line and for generating a current output signal indicative of sensed reactive current, voltage sensing means for sensing a voltage condition in a selected line and for generating a voltage output signal indicative of sensed voltage, switch means in circuit with said current sensing means and said voltage sensing means for selectively connecting the capacitor bank relative to the electrical line, and programmed control means in circuit with said switch means and the line for automatically actuating said switch means selectively to couple the capacitor bank relative to the line to adjust the reactive power thereof, said control means including phase determination means for automatically determining the selected phase of said sensed reactive current relative to the sensed line voltage in response to at least one of said output signals.

42. An adaptive power capacitor controller system according to claim 41, wherein said control means further comprises compensation means for automatically compensating for said phase of said sensed reactive current relative to said sensed voltage.

43. An adaptive power capacitor controller system according to claim 41, wherein the electrical line carries real power and reactive power, said phase determination means further including power determination means for determining at least one of said reactive power and said real power of the set of lines in response to at least one of said current output signal and said voltage output signal, said power determination means further including means for generating a first value indicative of said reactive power and a second value indicative of said real power, memory means for storing predetermined phase compensation values associated with predetermined values of said real power and of said reactive power, means responsive to at least one of said first and second values and coupled to said memory means for automatically comparing said first and second values representative of said reactive power and of said real power, respectively, with said stored predetermined power values to determine an appropriate one of said stored phase angle compensation value, and adjustment means for automatically adjusting said phase angle of said reactive current by said appropriate phase angle compensation value.

44. An adaptive power capacitor controller system of the type arranged for adjusting the reactive power of a set of electrical lines by selectively applying a capacitor bank thereto, each electrical line carrying reactive current having a selected phase relative to a voltage in any of the lines, said controller system comprising current sensing means for sensing a reactive current condition in one of the lines and for generating a current output signal indicative of sensed reactive current of that line, voltage sensing means for sensing a voltage condition in one of the lines and for generating a voltage output signal indicative of sensed line voltage of that line, switch means in circuit with said current sensing means and said voltage sensing means for selectively connecting the capacitor bank relative to the electrical line, and control means in circuit with said switch means and the line for automatically actuating said switch means selectively to couple the capacitor bank relative to the line to adjust the reactive power thereof, said control means including memory means for storing at least one of said line conditions and for storing a program sequence that operates said switch means in a selected manner to couple selectively the capacitor bank relative to the line, first determination means for automatically determining a change in said reactive current of the line in response to said current output signal during said program sequence, said first determination means including means for generating a first value corresponding to said change in reactive current, second determination means for automatically determining a change in said voltage of the line in response to said voltage output signal during said program sequence, said second determination means including means for generating a second value corresponding to a negative change in said voltage, comparison means for comparing at least one of said first and second values with one of a predetermined voltage value stored in said memory means and a predetermined reactive current value stored in said memory means, each said one predetermined value having a selected compensation phase angle value associated therewith and wherein said comparison determines an appropriate phase angle value indicative of an amount by which said control means compensates for said phase angle, and adjustment means for automatically adjusting said phase angle of said sensed reactive current by said appropriate phase angle value, whereby said first and second values indicate a reverse current condition in the line.

45. An adaptive power capacitor controller system of the type arranged for adjusting the reactive power of an AC electrical line by selectively applying a capacitor bank relative to the line, the electrical line supporting a voltage and carrying reactive current, said controller system comprising current sensing means for sensing a reactive current condition in the line and for generating a current output signal indicative of sensed reactive current, voltage sensing means for sensing a voltage condition in the electrical line and for generating a voltage output signal indicative of sensed line voltage, switch means in circuit with said current sensing means and said voltage sensing means for selectively connecting the capacitor bank relative to the electrical line, and control means in circuit with said switch means and the line for automatically actuating said switch means selectively to couple the capacitor bank relative to the line to adjust the reactive power thereof, said control means including memory means for storing at least one of said line conditions and for storing a program sequence that operates said switch means in a manner to couple selectively the capacitor bank relative to the line, first determination means for automatically determining a change in said reactive current of the line in response to said current output signal during said program sequence, said first determination means including means for generating a first value when said change in said reactive current is about equal to zero, and second determination means for automatically determining a change in said voltage of the line in response to said voltage output signal during said program sequence, said second determination means including means for generating a second value corresponding to said change in said voltage, whereby said first and second values indicate a reverse power condition in the line.

46. Adaptive power capacitor controller system according to claim 45, wherein said memory means has stored therein a first selected voltage level determining connection of the capacitor bank to the line and a second selected voltage level determining disconnection of the capacitor bank from the line, and wherein said control means further comprises means, responsive to said first and said second values and to said voltage output signal, and coupled to said memory means, for determining connection of the capacitor bank to the line when said line voltage is below said first selected voltage level and determining disconnection of the capacitor bank from the line when the line voltage exceeds said second selected voltage level.

47. Adaptive power capacitor controller system according to claim 45, wherein said control means further includes bank connection inhibit means for automatically inhibiting connection of the capacitor bank relative to the line in response to said first value.

48. An adaptive power capacitor controller system of the type arranged for adjusting the reactive power of an AC electrical line by selectively applying a capacitor bank relative to the line, the electrical line carrying reactive current and supporting a selected voltage, said controller system comprising current sensing means for sensing a reactive current condition in the line and for generating a current output signal indicative of sensed reactive current, voltage sensing means for sensing a voltage condition in the electrical line and for generating a voltage output signal indicative of sensed line voltage, switch means in circuit with said current sensing means and said voltage sensing means for selectively connecting the capacitor bank relative to the line, and programmed control means in circuit with said switch means and the line for automatically actuating said switch means selectively to couple the capacitor bank relative to the line to adjust the reactive power thereof, said control means including memory means for storing at least one of said line conditions and for storing a program sequence that operates said switch means in a selected manner to selectively couple the capacitor bank relative to the line, determination means coupled to said memory means for automatically determining a change in said reactive current of the line during said program sequence in response to at least one of said stored line conditions, parameter selection means for automatically establishing a first selected level determining connection of the capacitor bank relative to the electrical line in response to said change in reactive current and for automatically establishing a second selected level determining disconnection of the capacitor bank from the electrical line in response to said change in reactive current, time determination means for determining a first time interval between successive switching operations of said switch means, and comparison means for comparing said first time interval with a predetermined time interval stored in said memory means.

49. Adaptive power capacitor controller system according to claim 48, further comprising inhibit means for inhibiting connection of the capacitor bank relative to the line when said first time interval is less than said stored predetermined time interval.

50. Adaptive power capacitor controller according to claim 49 further comprising adjustment means for adjusting said time interval between said successive switching operations of said switch means by adding a selected time adjustment amount to increase the time interval between said successive switching operations.

51. An adaptive power capacitor controller system of the type arranged for adjusting the reactive power of an AC electrical line by selectively applying a capacitor bank relative to the line, the electrical line carrying reactive current and supporting a selected voltage, said controller system comprising current sensing means for sensing a reactive current condition in the line and for generating a current output signal indicative of sensed reactive current, voltage sensing means for sensing a voltage condition in the electrical line and for generating a voltage output signal indicative of sensed line voltage, switch means in circuit with said current sensing means and said voltage sensing means for selectively connecting the capacitor bank relative to the electrical line, and control means in circuit with said switch means and the line for automatically actuating said switch means selectively to couple the capacitor bank relative to the line to adjust the reactive power thereof, said control means including memory means for storing at least one of said voltage condition and said reactive current condition, and for storing a program sequence that operates said switch means in a manner to selectively couple the capacitor bank relative to the line, and determination means coupled to said memory means for automatically determining a change in said line voltage of the line in response to at least said stored voltage condition during said program sequence, voltage selection means for automatically establishing a selected voltage value in response to at least said change in line voltage determined according to said program sequence, and inhibit means for automatically inhibiting said control means from operating said switch means when a combination of said line voltage and said voltage guard value is outside of a predetermined voltage range stored in said memory means.

52. Adaptive capacitor controller system according to claim 51, wherein said inhibit means further comprises first prevention means for inhibiting connection of the capacitor bank to the line when the arithmetic sum of the selected voltage value and the line voltage is greater than a first selected voltage level stored in said memory means, and second prevention means for inhibiting disconnection of the capacitor bank from the line when the arithmetic difference between the selected voltage value and the line voltage is less than a second selected voltage value stored in said memory means.

53. Adaptive capacitor controller system according to claim 52, wherein said voltage range defined by said first selected voltage value and said second selected voltage value is between about 90 volts and about 140 volts for a 120 volt line, and between about 180 volts and about 280 volts for a 240 volt line.

54. Adaptive power capacitor controller system according to claim 51, wherein said selected voltage level is between about 0.1 volts and about 10 volts.

55. Adaptive power capacitor controller system for adjusting the reactive power of an electrical line by adding a capacitor bank thereto, said system comprising a sensor for sensing one or more electrical parameters of the line, switching means coupled to the capacitor bank for connecting the bank to the line, said switching means establishing a first line condition when the capacitor bank is connected to the line and establishing a second line condition when the capacitor bank is disconnected from the line, and means for automatically determining a first threshold value indicative of the capacitor bank connected to the line and a second threshold value indicative of the capacitor bank disconnected from the line in response to said electrical parameters sensed by said sensor when said switching means attains said first line condition and when said switching means attains said second line condition.

56. A power capacitor controller system, comprising sensor means for sensing one or more electrical parameters of an electrical line, switching means coupled to a capacitor bank for connecting the bank to the line, the switching means establishing a first line condition when the capacitor bank is connected to the line and establishing a second line condition when the capacitor bank is disconnected from the line, wherein the capacitor bank has a selected size, means for automatically determining a first threshold value indicative of the capacitor bank connected to the line and a second threshold value indicative of the capacitor bank disconnected from the line in response to the electrical parameters sensed by the sensor means when the switching means attains the first line condition and when the switching means attains the second line condition, and size determination means for determining the size of the capacitor bank in response to the sensed electrical parameters in the line.

57. A method for adaptively and automatically adjusting the reactive power of an electrical line by adding a capacitor bank thereto, the method comprising the steps of sensing one or more electrical parameters of the line, selectively connecting the bank to the line to establish a first line condition when the capacitor bank is connected to the line and to establish a second line condition when the capacitor bank is disconnected from the line, and automatically determining a first threshold value indicative of the capacitor bank connected to the line and a second threshold value indicative of the capacitor bank disconnected from the line in response to the sensed electrical parameters when the first line condition is attained and when the second line condition is attained.

58. A method for adjusting the reactive power of a set of multi-phase electrical lines by selectively applying a capacitor bank thereto, the electrical lines carrying reactive current having a selected phase angle relative to the voltage of any of the electrical lines, the method comprising the steps of sensing a reactive current condition in a selected line and generating a current output signal indicative of sensed reactive current, sensing a voltage condition in a selected line and generating a voltage output signal indicative of sensed voltage, automatically and selectively connecting the capacitor bank relative to the electrical line, and automatically determining the selected phase of the sensed reactive current relative to the sensed line voltage in response to at least one of the output signals.

59. The method of claim 58 further comprising the step of automatically compensating for the phase of the sensed reactive current relative to the sensed voltage.

60. The method of claim 58 wherein the step of automatically determining the phase further includes the steps of determining at least one of the reactive power and the real power of the set of lines in response to at least one of the current output signal and the voltage output signal, generating a first value indicative of the reactive power and a second value indicative of the real power, storing predetermined phase compensation values associated with predetermined values of the real power and of the reactive power, comparing the first and second values representative of the reactive power and of the real power, respectively, with the stored predetermined power values to determine an appropriate one of the stored phase angle compensation value, and automatically adjusting the phase angle of the reactive current by the appropriate phase angle compensation value.

61. A method for adjusting the reactive power of a set of electrical lines by selectively applying a capacitor bank thereto, each electrical line carrying reactive current having a selected phase relative to a voltage in any of the lines, the method comprising the steps of sensing a reactive current condition in one of the lines and generating a current output signal indicative of sensed reactive current of that line, sensing a voltage condition in one of the lines and generating a voltage output signal indicative of sensed line voltage of that line, selectively connecting the capacitor bank relative to the electrical line to adjust the reactive power thereof, storing at least one of the line conditions and for storing a program sequence that couples selectively the capacitor bank relative to the line, automatically determining a change in the reactive current of the line in response to the current output signal during the program sequence, and generating a first value corresponding to the change in reactive current, automatically determining a change in the voltage of the line in response to the voltage output signal during the program sequence, and generating a second value corresponding to a negative change in the voltage, comparing at least one of the first and second values with one of a predetermined voltage value and a predetermined reactive current value, each one of the predetermined values having a selected compensation phase angle value associated therewith and wherein the comparison determines an appropriate phase angle value indicative of an amount by which the control means compensates for the phase angle, and automatically adjusting the phase angle of the sensed reactive current by the appropriate phase angle value, whereby the first and second values indicate a reverse current condition in the line.

62. A method for adjusting the reactive power of an AC electrical line by selectively applying a capacitor bank relative to the line, the electrical line supporting a voltage and carrying reactive current, the method comprising the steps of sensing a reactive current condition in the line and generating a current output signal indicative of sensed reactive current, sensing a voltage condition in the electrical line and generating a voltage output signal indicative of sensed line voltage, selectively connecting the capacitor bank relative to the electrical line, and to adjust the reactive power thereof, storing at least one of the line conditions and for storing a program sequence that couples selectively the capacitor bank relative to the line, automatically determining a change in the reactive current of the line in response to the current output signal during the program sequence, and generating a first value when the change in the reactive current is about equal to zero, and automatically determining a change in the voltage of the line in response to the voltage output signal during the program sequence, and generating a second value corresponding to the change in the voltage, whereby the first and second values indicate a reverse power condition in the line.

63. The method of claim 62 further comprising the steps of storing a first selected voltage level determining connection of the capacitor bank to the line and storing a second selected voltage level determining disconnection of the capacitor bank from the line, and automatically determining connection of the capacitor bank to the line when the line voltage is below the first selected voltage level and determining disconnection of the capacitor bank from the line when the line voltage exceeds the second selected voltage level.

64. The method of claim 62 further comprising the steps of automatically inhibiting connection of the capacitor bank relative to the line in response to the first value.

65. A method for adjusting the reactive power of an AC electrical line by selectively applying a capacitor bank relative to the line, the electrical line carrying reactive current and supporting a selected voltage, the method comprising the steps of sensing a reactive current condition in the line and generating a current output signal indicative of sensed reactive current, sensing a voltage condition in the electrical line and generating a voltage output signal indicative of sensed line voltage, selectively connecting the capacitor bank relative to the line to adjust the reactive power thereof, storing at least one of the line conditions, a program sequence that selectively couples the capacitor bank relative to the line, and a selected time interval, automatically determining a change in the reactive current of the line during the program sequence in response to at least one of the stored line conditions, automatically establishing a first selected level determining connection of the capacitor bank relative to the electrical line in response to the change in reactive current and automatically establishing a second selected level determining disconnection of the capacitor bank from the electrical line in response to the change in reactive current, determining a first time interval between successive switching operations, and comparing the first time interval with the predetermined time interval.

66. The method of claim 65 further comprising the step of inhibiting connection of the capacitor bank relative to the line when the first time interval is less than the stored predetermined time interval.

67. The method of claim 66 further comprising the step of adjusting the time interval between successive switching operations of the capacitor bank by adding a selected time adjustment amount to increase the time interval between the successive switching operations.

68. A method for adjusting the reactive power of an AC electrical line by selectively applying a capacitor bank relative to the line, the electrical line carrying reactive current and supporting a selected voltage, the method comprising the steps of sensing a reactive current condition in the line and generating a current output signal indicative of sensed reactive current, sensing a voltage condition in the electrical line and generating a voltage output signal indicative of sensed line voltage, selectively connecting the capacitor bank relative to the electrical line to adjust the reactive power thereof, storing at least one of the voltage condition and the reactive current condition, and storing a program sequence that selectively couples the capacitor bank relative to the line, automatically determining a change in the line voltage of the line in response to at least the stored voltage condition during the program sequence, automatically establishing a selected voltage value in response to at least the change in line voltage determined according to the program sequence, and automatically inhibiting connection of the capacitor bank relative to the line when a combination of the line voltage and the voltage value is outside of a predetermined voltage range stored in the memory means.

69. The method of claim 68 wherein the step of automatically inhibiting further includes the steps of preventing connection of the capacitor bank to the line when the arithmetic sum of the selected voltage value and the line voltage is greater than a first selected voltage level stored in the memory means, and preventing disconnection of the capacitor bank from the line when the arithmetic difference between the selected voltage value and the line voltage is less than a second selected voltage value stored in the memory means.

* * * * *

UNITED STATES PATENT AND TRADEMARK OFFICE
CERTIFICATE OF CORRECTION

PATENT NO. : 5,670,864
DATED : September 23, 1997
INVENTOR(S) : Marx et al.

It is certified that error appears in the above-identified patent and that said Letters Patent is hereby corrected as shown below:

Title page, after [54], delete: "ADAPTIVE AUTOMATIC POWER CAPACITOR FOR CONTROLLING CONTROLLER A CAPACITOR BANK OF A POWER DISTRIBUTION SYSTEM"
and insert: "ADAPTIVE AUTOMATIC POWER CAPACITOR CONTROLLER FOR CONTROLLING A CAPACITOR BANK OF A POWER DISTRIBUTION SYSTEM";

At column 1, lines 1-4, delete: "ADAPTIVE AUTOMATIC POWER CAPACITOR FOR CONTROLLING CONTROLLER A CAPACITOR BANK OF A POWER DISTRIBUTION SYSTEM"
and insert: "ADAPTIVE AUTOMATIC POWER CAPACITOR CONTROLLER FOR CONTROLLING A CAPACITOR BANK OF A POWER DISTRIBUTION SYSTEM";

At column 8, line 36, delete: "...phase angle a the..." and insert: "...phase angle. the...";

At column 10, line 6, delete: "...same pans..." and insert: "...same parts...";

At column 13, line 20-21, delete: "...timers in the art..." and insert: "...timers are known in the art ...";

At column 14, line 25, delete: "...software, are program..." and insert: "...software program that is...";

UNITED STATES PATENT AND TRADEMARK OFFICE
CERTIFICATE OF CORRECTION

PATENT NO.    :   5,670,864
DATED         :   September 23, 1997
INVENTOR(S)   :   Marx et al.

It is certified that error appears in the above-identified patent and that said Letters Patent is hereby corrected as shown below:

At column 18, line 4, delete: "power me is performed..." and insert: "day test is performed...";

At column 35, line 54-55, delete: "...means capacitor to connected bank capacitor bank..." and insert: "...means to connect the capacitor bank...".

Signed and Sealed this

Fifteenth Day of June, 1999

Attest:

Q. TODD DICKINSON

Attesting Officer

Acting Commissioner of Patents and Trademarks